(12) United States Patent
Noyes et al.

(10) Patent No.: US 11,972,445 B2
(45) Date of Patent: *Apr. 30, 2024

(54) METHOD AND SYSTEMS FOR DISTRIBUTED SIGNALS FOR USE WITH ADVERTISING

(71) Applicant: Commerce Signals, Inc., Jersey City, NJ (US)

(72) Inventors: Thomas Noyes, Davidson, NC (US); Rodney C. Cook, Edmonds, WA (US); Neil Bushong, Charlotte, NC (US)

(73) Assignee: COMMERCE SIGNALS, INC., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,054

(22) Filed: Jan. 7, 2022

(65) Prior Publication Data

US 2022/0180382 A1   Jun. 9, 2022

Related U.S. Application Data

(63) Continuation of application No. 15/821,014, filed on Nov. 22, 2017, now Pat. No. 11,222,346, which is a
(Continued)

(51) Int. Cl.
*G06Q 30/0201* (2023.01)
*G06Q 30/0202* (2023.01)
(Continued)

(52) U.S. Cl.
CPC ..... *G06Q 30/0201* (2013.01); *G06Q 30/0202* (2013.01); *G06Q 30/0206* (2013.01);
(Continued)

(58) Field of Classification Search
CPC ...................................................... G06Q 30/02
See application file for complete search history.

(56) References Cited

U.S. PATENT DOCUMENTS

| 5,077,665 A | 12/1991 | Silverman et al. |
| 6,216,129 B1 | 4/2001 | Eldering |
| (Continued) | | |

FOREIGN PATENT DOCUMENTS

| EP | 2002049844 A | 2/2002 |
| EP | 2063387 A1 | 5/2009 |
| WO | 2008051807 A1 | 5/2008 |

OTHER PUBLICATIONS

Mobasher, Bamshad & Dai, Honghua & Luo, Tao & Nakagawa, Miki. (2001). Improving the Effectiveness of Collaborative Filtering on Anonymous Web Usage Data. (Year: 2001).*

(Continued)

*Primary Examiner* — Katherine Kolosowski-Gager
(74) *Attorney, Agent, or Firm* — Sterne, Kessler, Goldstein & Fox P.L.L.C.

(57) ABSTRACT

Systems and methods are provided for electronic stimulus evaluation through one or more signals. The one or more signals protect underlying raw data relating to behavior, including purchase behavior and location-based behavior. A server platform in network communication with at least one signal buyer computer and at least one signal provider computer facilitates creation of the one or more signals. Anonymized identifiers are used to identify objects or consumers associated with behavior data and exposure to the electronic stimulus. The server platform provides optimization analytics for the stimulus based on the one or more signals, which include measurement signals, behavior signals, and lift signals.

20 Claims, 13 Drawing Sheets

Related U.S. Application Data continuation-in-part of application No. 15/788,956, filed on Oct. 20, 2017, now Pat. No. 10,769,646, which is a continuation of application No. 14/214,269, filed on Mar. 14, 2014, now Pat. No. 9,799,042.

(60) Provisional application No. 61/791,297, filed on Mar. 15, 2013.

(51) Int. Cl.
| | |
|---|---|
| G06Q 30/0242 | (2023.01) |
| G06Q 30/06 | (2023.01) |
| G06Q 30/08 | (2012.01) |
| G06Q 40/04 | (2012.01) |

(52) U.S. Cl.
CPC ......... *G06Q 30/0244* (2013.01); *G06Q 30/06* (2013.01); *G06Q 30/08* (2013.01); *G06Q 40/04* (2013.01)

(56) References Cited

U.S. PATENT DOCUMENTS

| | | | |
|---|---|---|---|
| 6,275,824 | B1 | 8/2001 | O'Flaherty et al. |
| 6,324,519 | B1 | 11/2001 | Eldering |
| 6,363,488 | B1 | 3/2002 | Ginter et al. |
| 6,381,602 | B1 | 4/2002 | Shoroff et al. |
| 6,850,900 | B1 | 2/2005 | Hare et al. |
| 7,233,948 | B1 | 6/2007 | Shamoon et al. |
| 7,415,432 | B1 | 8/2008 | Gianakouros et al. |
| 7,542,951 | B1 | 6/2009 | Chakrabarti et al. |
| 7,630,986 | B1 | 12/2009 | Herz et al. |
| 8,224,725 | B2 | 7/2012 | Grim et al. |
| 8,229,902 | B2 | 7/2012 | Vishniac et al. |
| 8,285,610 | B2 | 10/2012 | Engle et al. |
| 8,355,955 | B1 | 1/2013 | Mirchandani et al. |
| 8,380,738 | B2 | 2/2013 | Tatemura et al. |
| 8,671,353 | B1 | 3/2014 | Varadarajan |
| 8,812,355 | B2 | 8/2014 | Angell et al. |
| 8,914,903 | B1 | 12/2014 | Lee et al. |
| 9,286,391 | B1 | 3/2016 | Dykstra et al. |
| 9,749,780 | B2 | 8/2017 | Huang et al. |
| 9,799,042 | B2 | 10/2017 | Noyes |
| 2001/0004733 | A1 | 6/2001 | Eldering |
| 2003/0115129 | A1 | 6/2003 | Feaver et al. |
| 2003/0144924 | A1 | 7/2003 | McGee |
| 2004/0148290 | A1 | 7/2004 | Merenda et al. |
| 2004/0267630 | A1 | 12/2004 | Au et al. |
| 2005/0004789 | A1 | 1/2005 | Summers |
| 2005/0044423 | A1 | 2/2005 | Mellmer et al. |
| 2005/0177742 | A1 | 8/2005 | Benson et al. |
| 2006/0080229 | A1 | 4/2006 | Masella et al. |
| 2006/0136402 | A1 | 6/2006 | Lee |
| 2006/0167779 | A1 | 7/2006 | Turner |
| 2006/0168059 | A1 | 7/2006 | Chang et al. |
| 2006/0200556 | A1 | 9/2006 | Brave et al. |
| 2006/0230053 | A1 | 10/2006 | Eldering |
| 2007/0011050 | A1 | 1/2007 | Klopf et al. |
| 2007/0067297 | A1 | 3/2007 | Kublickis |
| 2007/0110240 | A1 | 5/2007 | Moskowitz et al. |
| 2007/0130070 | A1 | 6/2007 | Williams |
| 2007/0174119 | A1 | 7/2007 | Ramsey et al. |
| 2007/0208630 | A1 | 9/2007 | Chatter et al. |
| 2007/0271297 | A1 | 11/2007 | Jaffe et al. |
| 2008/0005002 | A1 | 1/2008 | Ferris |
| 2008/0059624 | A1 | 3/2008 | Groz et al. |
| 2008/0103795 | A1 | 5/2008 | Jakubowski et al. |
| 2008/0103902 | A1 | 5/2008 | Burdick et al. |
| 2008/0189232 | A1 | 8/2008 | Dunning et al. |
| 2008/0222170 | A1 | 9/2008 | Farnham et al. |
| 2008/0248815 | A1 | 10/2008 | Busch |
| 2008/0262925 | A1 | 10/2008 | Kim et al. |
| 2008/0270426 | A1 | 10/2008 | Flake et al. |
| 2009/0018918 | A1 | 1/2009 | Moneypenny et al. |
| 2009/0119172 | A1 | 5/2009 | Soloff |
| 2009/0132353 | A1 | 5/2009 | Maggenti et al. |
| 2009/0177591 | A1 | 7/2009 | Thorpe et al. |
| 2009/0177612 | A1 | 7/2009 | Gorham |
| 2009/0222329 | A1 | 9/2009 | Ramer et al. |
| 2009/0228397 | A1 | 9/2009 | Tawakol et al. |
| 2009/0234711 | A1 | 9/2009 | Ramer et al. |
| 2009/0240568 | A1 | 9/2009 | Ramer et al. |
| 2009/0240569 | A1 | 9/2009 | Ramer et al. |
| 2009/0307085 | A1 | 12/2009 | Lejano et al. |
| 2009/0327150 | A1 | 12/2009 | Flake et al. |
| 2010/0057560 | A1 | 3/2010 | Skudlark et al. |
| 2010/0131835 | A1 | 5/2010 | Kumar et al. |
| 2010/0156933 | A1 | 6/2010 | Jones et al. |
| 2010/0250336 | A1 | 9/2010 | Selinger et al. |
| 2010/0262497 | A1 | 10/2010 | Karlsson |
| 2010/0317420 | A1 | 12/2010 | Toffberg |
| 2011/0137786 | A1 | 6/2011 | Lutnick et al. |
| 2011/0178845 | A1 | 7/2011 | Rane et al. |
| 2011/0225037 | A1 | 9/2011 | Tunca et al. |
| 2011/0230114 | A1 | 9/2011 | Preez et al. |
| 2011/0246299 | A1 | 10/2011 | Satyavolu et al. |
| 2011/0246309 | A1 | 10/2011 | Shkedi |
| 2011/0258049 | A1 | 10/2011 | Ramer et al. |
| 2011/0264497 | A1 | 10/2011 | Clyne |
| 2011/0264567 | A1 | 10/2011 | Clyne |
| 2011/0283365 | A1 | 11/2011 | Moritz et al. |
| 2012/0042280 | A1 | 2/2012 | Hoffman |
| 2012/0054189 | A1 | 3/2012 | Moonka et al. |
| 2012/0066062 | A1 | 3/2012 | Yoder et al. |
| 2012/0066064 | A1 | 3/2012 | Yoder et al. |
| 2012/0066234 | A1 | 3/2012 | Lee et al. |
| 2012/0072846 | A1 | 3/2012 | Curtis |
| 2012/0179543 | A1 | 7/2012 | Luo et al. |
| 2012/0185349 | A1 | 7/2012 | Soroca et al. |
| 2012/0232960 | A1 | 9/2012 | Smith |
| 2012/0233206 | A1 | 9/2012 | Peterson et al. |
| 2012/0239479 | A1 | 9/2012 | Amaro et al. |
| 2012/0266081 | A1 | 10/2012 | Kao |
| 2012/0271748 | A1 | 10/2012 | DiSalvo |
| 2012/0284317 | A1 | 11/2012 | Dalton |
| 2012/0290518 | A1 | 11/2012 | Flinn et al. |
| 2012/0323674 | A1* | 12/2012 | Simmons ........... G06Q 30/0241 705/14.41 |
| 2012/0323954 | A1 | 12/2012 | Bonalle et al. |
| 2013/0021345 | A1 | 1/2013 | Hsiao et al. |
| 2013/0046723 | A1 | 2/2013 | Sweeney et al. |
| 2013/0060633 | A1 | 3/2013 | St-Pierre |
| 2013/0066592 | A1 | 3/2013 | Aupetit et al. |
| 2013/0066771 | A1* | 3/2013 | Ciurea ............... G06Q 30/0241 705/39 |
| 2013/0073366 | A1 | 3/2013 | Heath |
| 2013/0073568 | A1 | 3/2013 | Federov et al. |
| 2013/0097052 | A1 | 4/2013 | Dicker et al. |
| 2013/0191213 | A1 | 7/2013 | Beck et al. |
| 2013/0212041 | A1 | 8/2013 | Feldman et al. |
| 2013/0262510 | A1 | 10/2013 | Smith et al. |
| 2013/0275178 | A1 | 10/2013 | Flake et al. |
| 2013/0297608 | A1 | 11/2013 | Etoh et al. |
| 2013/0332987 | A1 | 12/2013 | Tenneti et al. |
| 2013/0346545 | A1 | 12/2013 | Petersen et al. |
| 2014/0052712 | A1 | 2/2014 | Savage et al. |
| 2014/0101685 | A1 | 4/2014 | Kitts et al. |
| 2014/0129499 | A1 | 5/2014 | Hawkins |
| 2014/0149273 | A1 | 5/2014 | Angell et al. |
| 2014/0229351 | A1 | 8/2014 | Lutnick et al. |
| 2014/0278762 | A1 | 9/2014 | Noyes |
| 2014/0278763 | A1 | 9/2014 | Noyes |
| 2014/0278764 | A1 | 9/2014 | Noyes |
| 2014/0278776 | A1 | 9/2014 | Noyes et al. |
| 2015/0095145 | A1 | 4/2015 | Shulman et al. |
| 2015/0121066 | A1 | 4/2015 | Nix |
| 2015/0178744 | A1 | 6/2015 | Noyes |
| 2015/0199699 | A1 | 7/2015 | Milton et al. |
| 2015/0213465 | A1 | 7/2015 | Noyes et al. |
| 2015/0220972 | A1 | 8/2015 | Subramanya et al. |
| 2015/0222604 | A1 | 8/2015 | Ylonen |
| 2016/0048900 | A1 | 2/2016 | Shuman et al. |
| 2016/0055129 | A1 | 2/2016 | Kan et al. |
| 2016/0162573 | A1 | 6/2016 | Fadel |

(56) References Cited

U.S. PATENT DOCUMENTS

2016/0335270 A1 11/2016 Garg et al.
2016/0352730 A1 12/2016 Spagnola
2017/0076109 A1 3/2017 Kaditz et al.
2017/0148048 A1 5/2017 Cook et al.
2017/0207916 A1 7/2017 Luce et al.
2017/0302696 A1 10/2017 Schutz et al.
2018/0040009 A1 2/2018 Noyes
2018/0096365 A1 4/2018 Noyes et al.
2018/0096417 A1 4/2018 Cook et al.
2020/0211083 A1 7/2020 Mao

OTHER PUBLICATIONS

Bui et al., A Multi-Attribute Negotiation Support System with Market Signaling for Electronic Markets, http://fulltext.calis.edu.cn/kluwer/pdf/09262644/10/3830020.pdf (Year: 2001).

Magid Abraham and Leonard M. Lodish, Getting the Most Out of Advertising and Promotion, 1990 (Year: 1990).

Mobasher, Bamshad, et al. "Improving the effectiveness of collaborative filtering on anonymous web usage data." Proceedings of the IJCAI 2001 Workshop on Intelligent Techniques for Web Personalization (ITWP01). 2001. (Year: 2001).

Real-Time Ad Targeting (Published online on Apr. 26, 2016 on https://www.quantcast.com/blog/real-time-ad-targeting-scalingquantcast-advertisng-to-100-million-machine learning-predictions-per-second/).

* cited by examiner

Measurement
Merchant Q4 Black Friday

Pre-Period: Oct 2, 2016- Nov 1, 2016
Media Period: Nov 2, 2016- Nov 29, 2016
Post-Period: 31 days ◉ Summary view  ◎ Detail View                                                     ⊕ Print   ⊗ CSV   ⊗ JSON   ◇ Merchant Sharing ⊛

◉ All channels   ◎ CP View   ◎ CNP View   (80% Confidence Level ⇅)                                          Select Audiences ⁎

Merchant: merchant_exposed_20170302.csv.gz

Among the observed cardholders, the Advertising campaign drove $8,142,893.56 in sales, resulting in a 6.6% lift. Calculated out to the entire exposed audience, incremental sales would be $13,143,571.61

| Incremental Sales | Sales Lift | Buy-Through Rate | Total Sales |
|---|---|---|---|
| $8,142,893.56 | ▲6.6% ◎ | 104.4% ◎ | $130,784,915.84 |
| Change in Average Purchase | Change in Frequency | Change in Purchasers | Change in $ Spent / Purchaser |
| ▽-1.97% ◎ | ▲8.79% ◎ | ▲5.69% ◎ | ▲0.90% ◎ |

Match Rate (Exposed and Control)

| Advertiser IDs | Matched Cards | Actual Purchasers |
|---|---|---|
| 17,224,156 ◎ | 10,561,694  61.32% ◎ | 654,877  3.80% ◎ |

There were 17,224,156 advertiser IDs provided that matched with 10,561,694 cardholders from the Advertising Campaign. 654,877 of those cardholders made purchases during the media period from Nov 2, 2016-Nov 29, 2016

METHOD AND SYSTEMS FOR DISTRIBUTED SIGNALS FOR USE WITH ADVERTISING

CROSS REFERENCE TO RELATED APPLICATIONS

This application relates to and claims priority from the following U.S. Patent Applications. This application is a continuation of U.S. application Ser. No. 15/821,014 filed Nov. 22, 2017, which is a continuation-in-part of U.S. application Ser. No. 15/788,956 filed Oct. 20, 2017, which is a continuation of U.S. application Ser. No. 14/214,269 filed Mar. 14, 2014 and issued as U.S. Pat. No. 9,799,042, which claims priority from U.S. Provisional Application No. 61/791,297 filed Mar. 15, 2013, each of which is incorporated herein by reference in its entirety.

BACKGROUND OF THE INVENTION

1. Field of Invention

The present invention relates to methods and systems for providing quantified observations and feedback for advertising and/or marketing on a federated data marketplace platform.

2. Description of the Prior Art

Generally, it is known in the prior art to provide market signals as information passed between participants in a market. Examples of relevant art documents include the following:

U.S. Patent Application Publication No. 2011/0178845 for "System and Method for Matching Merchants to a Population of Consumers" by inventors Rane, et al., filed Jan. 20, 2010, describes a process of data analysis for the purpose of improving targeted advertising and analytics of data, with the major focus on drawing useful inferences for various entities from aggregated data, wherein entities are not limited to businesses and may include government agencies (census, polling data, etc.).

U.S. Patent Application Publication No. 2012/0233206 for "Methods and Systems for Electronic Data Exchange Utilizing Centralized Management Technology" by inventors Peterson, et al., filed May 24, 2012, describes an exchange of data among business entities and the process of disclosing/receiving data and a central management system for companies engaged in strategic partnership or alliance, whereas Patent 1 deals with a market place dynamic rather than a data exchange within a locked-in partnership management.

U.S. Patent Application Publication No. 2012/0066062 for "Systems and Methods to Present Triggers for Real-Time Offers" by inventors Yoder, et al., filed Aug. 8, 2011, describes collecting consumer transaction data for the benefit of targeted advertisements and an auctioning process (auction engine) for providing data clusters to clients. For example, cardholders may register in a program to receive offers, such as promotions, discounts, sweepstakes, reward points, direct mail coupons, email coupons, etc. The cardholders may register with issuers, or with the portal of the transaction handler. Based on the transaction data or transaction records and/or the registration data, the profile generator is to identify the clusters of cardholders and the values representing the affinity of the cardholders to the clusters. Various entities may place bids according to the clusters and/or the values to gain access to the cardholders, such as the user. For example, an issuer may bid on access to offers; an acquirer and/or a merchant may bid on customer segments. An auction engine receives the bids and awards segments and offers based on the received bids. Thus, customers can get great deals; and merchants can get customer traffic and thus sales.

U.S. Patent Application Publication No. 2011/0246309 for "Method, stored program, and system for improving descriptive profiles" by inventor Shkedi, filed May 25, 2011, describes a process that enables entities to acquire databanks of user profiles that can add to existing knowledge of user profile data and the process is described as a transaction in that the entities disclose a set of profile information in exchange for additional, helpful data relevant to the disclosed data.

U.S. Patent Application Publication No. 2012/0323954 for "Systems and methods for cooperative data exchange" by inventors Bonalle, et al., filed Jun. 14, 2011, describes methods that enable business entities to gain greater, useful insights on their customers and build upon their relatively limited data via consumer data exchange, wherein upon sharing/merging/exchanging customer data, businesses can perform analysis to improve their business performance, and provides an example wherein original data may consist of a list of consumers, which can be enriched with the consumers' transaction history, search history, etc. via data exchange with other entities that own such information.

U.S. Patent Application Publication No. 2010/0262497 for "System and Methods for Controlling Bidding on Online Advertising Campaigns" by inventor Karlsson, filed Apr. 10, 2009, describes a system for managing bid prices of an online advertising campaign. The system includes a memory storing instructions for adjusting bid prices, and a campaign controller for generating a nominal bid price and a perturbation parameter, based on an ad request received from an advertiser. The system further includes an engine for generating a perturbed bid price based on the nominal bid price and the perturbation parameter, according to the instructions stored in the memory. The system further includes a serving unit for serving an ad impression based on the perturbed bid price. Also discloses that advertisers can bid on desired online ad delivery for their ad campaigns, describes management of the bidding process by managing and adjusting the bid price and describes systems and methods for a biddable multidimensional marketplace for advertising.

U.S. Pat. No. 8,224,725 for "Escrowing digital property in a secure information vault" by inventors Grim, et al., filed Sep. 15, 2005, describes that data can be escrowed by receiving escrow parameters including a condition(s) for releasing the escrowed data, and an escrow recipient. An escrow contract is then created based upon the specified escrow parameters. The escrowing further includes storing the digital data in a secure information vault, and storing the escrow contract, along with a pointer to the stored data, in a database. When the condition has been satisfied, the data is released to the escrow recipient. The condition(s) for release can be a payment sum, a date, an indication from a depositor, a trustee or a vault administrator, and/or fulfillment of another escrow contract; also describes keeping data secure and releasing data to certain parties upon satisfaction of certain criteria.

U.S. Pat. No. 8,285,610 for "System and method of determining the quality of enhanced transaction data" by inventors Engle, et al., filed Mar. 26, 2009, describes "enhanced data", non-financial data beyond the primary transaction data and includes invoice level and line item details (for examples see background section) which is collected at the merchant and delivered to a financial service network.

U.S. Patent Application Publication No. 2011/0264497 for "Systems and Methods to Transfer Tax Credits" by inventor Clyne, filed Apr. 25, 2011, includes disclosure for a list of references describing acquiring consumer purchase data.

U.S. Patent Application Publication No. 2011/0264567 for "Systems and Methods to Provide Data Services" by inventor Clyne, filed Apr. 25, 2011, describes providing access to data of diverse sources in general, and more particularly, transaction data, such as records of payment made via credit cards, debit cards, prepaid cards, etc., and/or information based on or relevant to the transaction data; also describes that transaction data can be used for various purposes and that transaction data or information derived from transaction data may be provided to third parties.

U. S. Patent Application Publication No. 2012/0066064 for "Systems and Methods to Provide Real-Time Offers via a Cooperative Database" by inventors Yoder, et al., filed Sep. 2, 2011, describes a computing apparatus is configured to: store transaction data recording transactions processed by a transaction handler; organize third party data according to community, where the third party data includes first data received from a first plurality of entities of a first community and second data received from a second plurality of entities of a second community; and responsive to a request from a merchant in the second community, present an offer of the merchant in the second community to users identified via the transaction data and the first data received from the first plurality of entities of the first community. In one embodiment, the first data provides permission from the merchant in the first community to allow the merchant in the second community to use intelligence information of the first community to identify users for targeting offers from the merchant in the second community.

U. S. Patent Application Publication No. 2012/0054189 for "User List Identification" by inventors Moonka, et al., filed Aug. 30, 2011, describes systems, methods, computer program products are provided for presenting content. An example computer implemented method includes identifying, by a data exchange engine executing on one or more processors, one or more user lists based on owned or permissioned data, each user list including a unique identifier; associating metadata with each user list including data describing a category for the user list, population data describing statistical or inferred data concerning a list or members in a given user list and subscription data including data concerning use of a given user list; storing in a searchable database a user list identifier and the associated metadata; and publishing for potential subscribers a list of the user lists including providing an interface that includes for each user list the unique identifier and the associated metadata.

U.S. Pat. No. 6,850,900 for "Full service secure commercial electronic marketplace" by inventors Hare, et al., filed Jun. 19, 2000, describes an electronic marketplace, and in particular to a full service secure commercial electronic marketplace which generically organizes, stores, updates, and distributes product information from a plurality of suppliers to facilitate multiple levels of sourcing, including contract and off-contract purchasing between the suppliers and a plurality of buyers.

SUMMARY OF THE INVENTION

The present invention relates to methods and systems for evaluating the effectiveness of a stimulus, determining a value of the stimulus, and optimization of stimulus presentation via a server platform computer in network communication with signal buyer devices and data source devices.

Signal constructs are used to provide feedback on stimuli and are discussed at length herein and in related applications U.S. application Ser. No. 14/214,223, filed Mar. 14, 2014, U.S. application Ser. No. 14/214,232, filed Mar. 14, 2014, U.S. application Ser. No. 14/214,253, filed Mar. 14, 2014, U.S. application Ser. No. 14/214,269, filed Mar. 14, 2014, now U.S. Pat. No. 9,799,042, U.S. application Ser. No. 14/633,770, filed Feb. 27, 2015, and U.S. application Ser. No. 14/677,315, filed Apr. 2, 2015, each of which is incorporated herein by reference in its entirety.

The methods and systems of the present invention are particularly useful in commerce, and more particularly, in the fields of marketing and advertising. The methods and systems of the present invention also extend to stimulus evaluation in other fields in general.

In one embodiment, the present invention is directed to a method for evaluating an effectiveness of an electronic stimulus including a stimulus transmittal computer transmitting a video, audio, text or graphical electronic stimulus to a multiplicity of devices connected over a network to the stimulus transmittal computer during a time period, thereby exposing a multiplicity of objects to the video, audio, text, or graphical electronic stimulus, providing a server platform computer connected over the network to a signal requestor computer, the stimulus transmittal computer, and a signal provider computer, the signal requestor computer sending an electronic message to the sever platform computer requesting at least one signal relating to behavioral data, the server platform computer sending an electronic message to the stimulus transmittal computer requesting a first set of anonymized object identifiers representing the multiplicity of objects exposed to the video, audio, text, or graphical electronic stimulus, the stimulus transmittal computer translating identities of the multiplicity of objects exposed to the video, audio, text, or graphical electronic stimulus during the time period from a first set of internally held object identifiers to the first set of anonymized object identifiers, the stimulus transmittal computer sending the first set of anonymized object identifiers to the server platform computer, the server platform computer translating the first set of anonymized object identifiers to a second set of anonymized object identifiers, the server platform computer sending the second set of anonymized object identifiers to the signal provider computer, the signal provider computer translating the second set of anonymized object identifiers to a second set of internally held object identifiers, the signal provider computer constructing the at least one signal relating to the behavioral data from raw data stored on the signal provider computer for the multiplicity of objects, wherein the raw data remains localized on the signal provider computer, the signal provider computer sending the at least one signal relating to the behavioral data to the server platform computer, and the server platform computer sending the at least one signal relating to the behavioral data to the signal requestor computer.

In another embodiment, the present invention is directed to a system for evaluating an effectiveness of an electronic stimulus including a server platform computer connected over a network with a signal requestor computer, a signal provider computer, and a stimulus transmittal computer, wherein the stimulus transmittal computer is connected over the network to a multiplicity of devices, and the stimulus transmittal computer is operable to transmit a video, audio, text, or graphical electronic stimulus to the multiplicity of devices during a time period, and is thereby operable to expose a multiplicity of objects to the video, audio, text, or graphical electronic stimulus, wherein the signal requestor computer is operable to transmit to the server platform computer an electronic message requesting at least one signal relating to behavioral data, wherein the server platform computer is operable to send an electronic message to the stimulus transmittal computer requesting a first set of anonymized object identifiers representing the multiplicity of objects exposed to the video, audio, text, or graphical electronic stimulus, wherein the stimulus transmittal computer is operable to translate identities of the multiplicity of objects exposed to the video, audio, text, or graphical electronic stimulus during the time period from a first set of internally held object identifiers to the first set of anonymized object identifiers and send the first set of anonymized object identifiers to the server platform computer, wherein the server platform computer is operable to translate the first set of anonymized object identifiers to a second set of anonymized object identifiers, wherein the server platform computer is operable to send the second set of anonymized object identifiers to the signal provider computer, wherein the signal provider computer is operable to translate the second set of anonymized object identifiers to a second set of internally held object identifiers, wherein the signal provider computer is further operable to construct the at least one signal relating to the behavioral data from raw data stored on the signal provider computer for the multiplicity of objects, wherein the raw data remains localized on the signal provider computer, wherein the signal provider computer is further operable to send the at least one signal relating to the behavioral data of the multiplicity of objects to the server platform computer, and wherein the server platform computer is operable to send the at least one signal relating to the behavioral data of the multiplicity of objects to the signal requestor computer.

In yet another embodiment, the present invention is directed to a method for evaluating an effectiveness of an electronic stimulus including a multiplicity of devices presenting a video, audio, text, or graphical electronic stimulus in web browsers, mobile applications, or computer programs on the multiplicity of devices, creating and storing raw data relating to the presentation of the video, audio, text, or graphical electronic stimulus in the web browsers, mobile applications, or computer programs on the multiplicity of devices, creating and storing raw data relating to behavior of objects associated with the multiplicity of devices during a time period subsequent to presenting the video, audio, text, or graphical electronic stimulus in the web browsers, mobile applications, or computer programs on the multiplicity of devices, constructing at least one signal based on the raw data relating to the behavior of objects associated with the multiplicity of devices, and adjusting the presentation of the video, audio, text, or graphical electronic stimulus based on the at least one signal.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 10 is a screen shot of a summary view of a measurement signal constructed in response to a signal request.

FIG. 11 is a screen shot of a grid view of a measurement signal constructed in response to a signal request.

DETAILED DESCRIPTION

Figure 1:
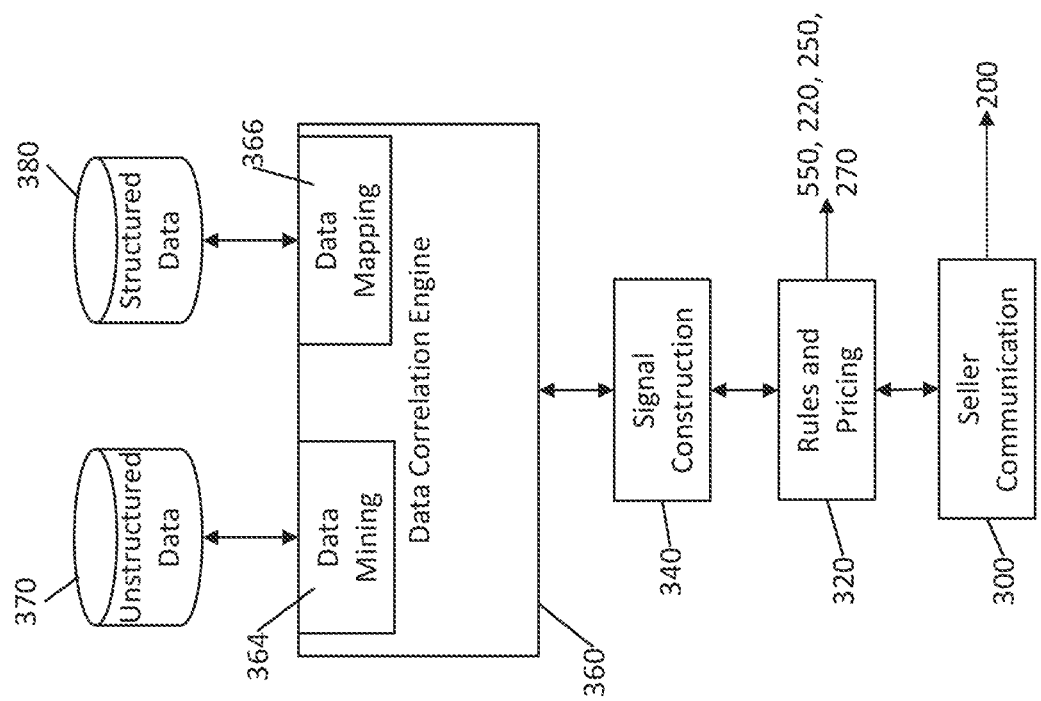
FIG. 1 is a flow diagram of an embodiment of the invention.

The present invention relates to methods and systems for stimulus evaluation via a server computer in network communication with signal buyer devices and data source devices.

The methods and systems of the present invention are particularly useful in commerce, and more particularly, in the fields of marketing and advertising. The methods and systems of the present invention also extend to stimulus evaluation in other fields in general.

One or more target objects or target object types are preferably predetermined for exposure to the stimulus. These target objects types include types of consumers and types of devices associated with consumers, such as consumers of particular age range, gender, socioeconomic status, familial status, location, etc. and/or consumers who subscribe to particular platforms for advertisement, such as online video streaming, online audio streaming, television, newspaper or magazine subscriptions, etc. The target object types are also determined based on any of the factors for cohorting or grouping objects discussed herein. A desired result from the exposure is also preferably predetermined. Measurement signals after transmission of the stimulus to target objects selected based on one or more target object types provide measurements of whether the stimulus reached the target objects and, for the target objects which were exposed to the stimulus, the results obtained by the stimulus exposure.

The present invention provides methods and systems for using buying and selling distributed data through a virtual marketplace or exchange using signals or indicators that represent the data without disclosing the data. By way of background, creators of signals are the sellers of information. The content of a seller's information based upon an historical interaction with one or more events, objects or activities that correspond to the behavior of a multitude of objects. Sellers of data or information have multiple requests to share their information. Signals or indicators are a mechanism to share derived information without disclosing the raw data. The value of any asset is highly correlated to the price that buyers are willing to pay.

There is a longstanding and unmet need for providing an automated, virtual signals data marketplace or exchange where signal creators (also the signal sellers and/or signal owners) selectively provide information of interest to signal buyers for defined uses, while protecting the underlying data and maintaining the control of the signal seller through its usage within a network-based, distributed data exchange where economic value of the data, as derived from its use, is the central pricing mechanism within agreements between the sellers and buyers. Nothing in infinite supply can have a price. Data may theoretically have an infinite value, but once it is shared, further dissemination is hard to prevent, thus the value of data quickly diminishes once it is shared. It is an objective of the Signals Exchange Marketplace to create a market for data within a signal or indicator framework, which protects the underlying data that the signals or indicators represent. This signals metaphor allows each signal or indicator provider/owner/seller the ability to construct, control and price their signals, protect further dissemination of both the signals, as well as the underlying data and constrain use of data for defined objectives.

The federated data exchange or marketplace is a technological solution to the technological problem of providing conformable electronic data files from unstructured data and structured data which is stored in differing file formats. The present invention is also inextricably tied to computer technology because the invention addresses the challenges of converting a first set of raw data files with different formats into a second set of signal files with one format, all while protecting the underlying data of the first set of raw data files and deriving value from the raw data files. The signal represents, but does not disclose, the underlying raw data and provides security inasmuch as the signal can be transmitted or exchanged without exposing any raw data.

A remote server computer is constructed and configured as the federated data marketplace platform computer to receive inputs via a communications network from observers that inform the efficacy of signal use and correlation across a multitude of participants and signal uses. Preferably, the remote server computer receives feedback from observers or signal buyers regarding qualities of relevance, correlation, and/or strength of signals.

Observers are entities that can attest to object state, behavior, activities or events. In one embodiment, observers are not direct parties in the signal buyer and seller agreements. It is an aspect of the current invention that the buyer and the marketplace will provide for the participation of external parties acting as observers. Preferably, observers are connected to the platform via observer computers connected to the remote server computer via a communications network.

In preferred embodiments of the present invention, a signal quality and a signal reputation are automatically generated by the federated data marketplace platform based upon an assessment of signal performance compared with an objective and/or based on the feedback received from observers. Observer attributions have different weights, values, or levels of trust to different participants. In competitive situations, some observers are economically incented to provide erroneous data to a defined buyer. Thus, the federated data marketplace platform provides a reputation of all participants and signals. In one embodiment, reputations are provided to participant devices.

In one embodiment, a signal performance is evaluated based on measurements of object behaviors and object events. Object behavioral data includes purchase data, location data, website browsing data, online shopping cart data, and any other form of data that is operable to be correlated to one or more stimuli. In one embodiment of the present invention, object behaviors are presented in the form of feedback from parties external to any given agreement between a signal buyer and a signal seller. Object behaviors obtained from external third-party observers are used to create and modify the correlation of signals to objects and behaviors within the federated data marketplace platform. Importantly these correlations are external to information available to buyer computers or seller computers independently. Third-party observer computers participate in the marketplace to provide feedback on objects. The parameters for feedback are covered within a multitude of agreements between a multitude of seller computers and buyer computers in one embodiment of the present invention.

In one embodiment of the present invention, a federated data marketplace platform automatically tracks the signals as the signals are transferred between signal buyers and sellers according to the parameters of active agreements, and monitors effectiveness of signal performance through feedback, observation of events, behaviors, environment and states of objects and objectives.

In one embodiment of the present invention for providing a signals marketplace or signal exchange for distributed signal sellers and signal buyers, a method for combining one or more signals from distributed data sources controlled by a multiplicity of owners for a shared objective within a signal marketplace is provided, including the steps of: providing at least one signal from a first data source and at least one signal from a second data source; wherein the signals originate from different distributed data sources controlled by different owners and the signals are registered in a centralized database and each of the signals is indexed in the centralized database based upon ownership, object relevance, behavior relevance, historical usage, performance, and correlation to other signals and data; and, wherein the value is automatically generated by each corresponding remote server computer associated with the remote database, based upon at least two factors associated with the value, and wherein the value includes relevance to a signal buyer and a buyer objective. By way of example and not limitation, the relevance to the signal buyer is based upon at least one objective, with the economic value of the signal based upon the measured performance of at least one signal toward at least one objective by the buyer. Preferably, the at least two factors are selected from: predictive accuracy, fidelity, relevance to an objective, near-real-timeliness, frequency, recency, state of an object, relationship of the source of the signal, reputation of the signal, reputation of the seller, affinity to a target, and/or usefulness to an objective. By way of example and not limitation, a restaurant wishes to advertise after the showing of a movie at a movie theater. The movie theater has a signal LEAVING MOVIE THEATER for a given object, or consumer. The campaign manager that manages the advertising campaign for an Italian restaurant finds the movie theater signal of use, but must gain additional information to determine which consumers leaving the movie theater prefer Italian food. The campaign manager requests AFFINITY to ITALIAN FOOD for a given object or consumer from the consumer's bank. Thus signals sourced from a bank and a movie theater are both used for a common objective of providing an advertisement for Italian food to a consumer leaving a movie theater.

The method may include additional steps including: aggregating the signals; creating a new signal or a synthetic signal from one or more signals from at least one source; linking the indexed signals to relational databases, wherein the signals are locally indexed by each signal owner and/or each seller associated with the signals; the virtual marketplace server computer and/or the owners creating and tracking their corresponding indexed signals; updating the remote and centralized indices of signals; and/or tracking and updating agreements for buying and selling signals.

A system for providing a signals marketplace in a virtualized computer network for generating signals from distributed data sources controlled by a multiplicity of owners and further includes at least the following components and their relationships with each other: a remote server computer constructed and configured in network-based communication with a centralized database further comprising at least one index for signals data, and operable to automatically generate an assigned value corresponding to each unique signal created by a signal seller within a remote index of signals data; wherein the remote indexed signals data are generated from remote structured and unstructured data. Receiving at least one signal from a first data source and at least one signal from a second data source, wherein the marketplace registers remote signals, which originate from different distributed data sources controlled by different owners into a centralized database or signals index; wherein each of the registered signals has a corresponding listing in the central database or index, a structure which conforms a marketplace taxonomy, a unique identifier for the signal type registered to each signal owner, and a unique identifier for each signal exchanged for each type from each owner; and, wherein each signal created by the remote owner has an assigned value based on at least two factors both of which are dependent upon a underlying raw data held by the seller and a buyer objective. Preferably, the signals marketplace system automatically recommends signals, and the price for a given usage for both signal buyers signal sellers or signal owners. Additionally or alternatively, the recommended pricing is automatically generated based upon a number of factors, including relevance to an objective, fidelity, near-real-timeliness or recency, affinity, predictive accuracy, and combinations thereof, and/or is negotiated in a bid-response exchange between the owners and buyers.

In the virtual marketplace, purchases of the owners' signals are tracked by the owners or sellers, within the remote server computer, and in the signals marketplace, which automatically tracks the signals data through its function of transferring signal information between buyer and seller within active agreements, and monitoring feedback on signal performance through observation of events, behaviors, environment and states of objects and objectives. The marketplace uses this feedback to update directories, indices, pricing, history, agreements, and correlations to an objective. Also preferably, the signals marketplace centralized server computer automatically tracks and manages signal and participant reputation for communication to other marketplace participants. The signals and their corresponding owners, as well as buyers, brokers, publishers, observers and other participants are registered and registration information is stored in the centralized database associated with the virtual marketplace remote server computer, and the registration information is stored in a shared directory associated with the centralized database.

The present invention also provides an embodiment including a method for creating and using a virtual marketplace for valuing and selling signals generated from distributed data sources that are controlled by a multiplicity of owners, the method steps including: providing at least one signal from a first data source and at least one signal from a second data source to a remote server computer for a signal marketplace or exchange; wherein the signals originate from different distributed data sources controlled by different owners and the signals are indexed and listed in a centralized database and each of the indexed signals is linked to corresponding relational databases; and, wherein a value for each centralized indexed signal is automatically generated by the remote server computer associated with the seller where terms of use have been agreed. The value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof. Also, in this method embodiment, as with the systems of the present invention, the marketplace provides for participation and compensation of other parties that observe object behavior, object state or are otherwise capable of providing feedback signals corresponding to a state, behavior, activity, and/or an event. This observer feedback informs the agreements, economic value of the signals, object preferences, calculated correlation of signal information, environmental projections and other marketplace functions. The economic value of the observation can be calculated by the marketplace, and these observation feedback signals can be indexed and purchased within the marketplace. Advantageously, the listed index provides for automated matching with buyer candidates having corresponding objectives for buying signals and signals data, and wherein the objectives include consumer state, events and behavior(s). Additional method steps include: the step of automatically updating the listed index and/or creating new listings; receiving a defined use and an agreement to report on a result of use by a registered buyer with the server computer; releasing signal data to a registered buyer based upon the agreement between the signal owner and the registered buyer; monitoring performance of the at least one signal compared with a corresponding objective; automatically determining a relevance to an objective for the at least one signal based on comparison with consumer feedback and consumer behavior; and/or limiting signal availability based upon a rules engine that automatically considers buyer agreement, identity, campaign type, signal requested, price, redemption signal type, purchase quantity, past performance of signal, past performance of campaign type, past performance of buyer; automatically correlating how the value of the information decays over time and with respect to relevance to the objective; and combinations thereof.

According to the present invention, the signal owner controls how the at least one signal is created, generated and/or constructed and according to the usage stipulated by the buyer and seller. The virtual marketplace or exchange between signal sellers and signal buyers, preferably the at least one signal includes a signal type selected from the group consisting of: event signals, activity signals, behavior signals, performance signals, relational signals, location signals, loyalty signals, purchase signals, social signals, and combinations thereof.

Methods of the present invention further include the step of generating a value of signal relevance to the objective based upon signal feedback, object behavior, object state, and/or consumer reputation; and, more particularly, wherein the value of the at least one signal depends upon the time of the at least one signal from an event occurrence, and wherein the value of the at least one signal decays over time. Significantly, a category of signals that represents real time or near real time activity, events, states and behavior have values that decay quickly with time. In this instance a signal that represents an object's activity 1 second ago has a greater value than the same signal that is 1 hour old. The signals marketplace enables the transmission of these real-time signals within the rules and constraints of the participants, consumers, marketplace and regulatory authorities.

Preferably, the virtual marketplace or exchange server computer receives feedback from the buyers and observers regarding qualities of relevance, correlation, and/or strength of each of the at least one signal. Observers are entities that can attest to object state, behavior, activities or events. Observers may not be direct party in the buyer and seller agreements. It is an aspect of the current invention that the buyer and the marketplace will provide for the participation of external parties acting as observers. In preferred embodiments of the present invention, a signal quality and a signal reputation are automatically generated by the virtual marketplace based upon an assessment of signal performance compared with an objective and/or based on the feedback received. By way of example and not limitation, observer attributions may be have different weight, value or trust to different participants. In competitive situations, some observers are economically incented to provide erroneous data to a defined buyer. Thus it is an aspect of the present invention to provide for a reputation of all participants and signals.

The present invention virtual data marketplace for signals is built on the framework of coordinating signals or indicators within a multiplicity of corresponding signal owners or signal sellers, the method steps performed by a signal owner include: constructing at least one signal associated with a behavior of an object and/or an activity and/or an event associated with the object in a signal owner computer that is constructed and configured for network-based communication with a remote server computer, wherein the at least one signal based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; registering the signal type within the marketplace; creating rules for usage and disclosure, indexing the at least one signal remotely; listing the indexed signals in a remote database associated with the remote server computer; creating a remote correlation of local signals to external signals and information; communicating the remote signal index and remote correlation to the centralized data marketplace, wherein the centralized marketplace combines a multiplicity of remote indices and correlations to assist in discovery and automated matching with buyer candidates; and updating the listing of the indexed signals and signal correlations by the signal seller or signal owner; discovery of signals for a use by a multiplicity of buyers, pricing of signals for a defined use, the creation of agreements for use, the regulatory and consumer permission of use, the transmission and tracking during use, incorporation of observer feedback during and after use, calculation of the value created through the use, and for the clearing and settlement based upon the terms of the agreement.

The at least one signal includes a signal type selected from the group consisting of: event signals, activity signals, behavior signals, relational signals, location signals, loyalty signals, purchase signals, performance signals, social signals, and combinations thereof. Signals are generated or constructed from both structured and unstructured data. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data and unstructured data by a correlation engine. In constructing the at least one signal or indicator, preferably the signal seller (or its system and seller correlation engine) automatically determines a relevance to an objective from historical performance and including external observations and feedback on object state, activity or behavior.

Structured data generally refers to data stored in a structured format, such as data stored in databases. An example of structured data includes payment data stored in a bank's database. Web browsing history and social media activity including likes, interests, and "check-ins" to businesses are other examples of structured data. Unstructured data generally refers to data which is not stored in a structured format in a database and for which patterns can be recognized over time. Unstructured data includes environmental data. In the context of a mobile device, unstructured data includes time, altitude, weather, temperature, lighting, position, radio signals such as BLUETOOTH or WIFI signals, pictures, location, pulse, blood pressure, etc. Unstructured data typically does not require action on the part of a signal requestor to provide the data. Instead, the device provides the unstructured data according to permissions given by the device or user of the device.

While the definition and construction of the signal is at the discretion of the Seller, generally signals conform to a common signal structure whose elements are named and formatted to marketplace conventions for the purpose of creating a common taxonomy for exchange of signal information. In the case of a signal exchange within a signals marketplace, but also for exchange outside of a marketplace, the signal structure provides for secure and reliable transportation and translation of an information payload contained with a signal. The signal construct defines the source, the destination, the delivery channel, the method for securing the data, the agreement under which the data is exchanged, a transaction identifier, a transaction time, information necessary to confirm receipt, template which describe the signal or message type, and the payload of the message. Sellers and buyers use the signals construct to create, register, publish, discover, assess, sell, manage, and measure data exchange according to the systems and methods of the present invention. Signal exchanges include both buyer-initiated and seller-initiated signals; some examples follow for illustration purposes, but are not intended to limit the claimed invention thereto.

Buyer Initiated Behavior Signal (BIBS). Behavior signals are published by sellers which observe object behavior. For a given buyer initiated behavior signal, the buyer of a behavior signal initiates the transaction through a request for a registered behavior signal from seller for a given event, object or category of objects. The content of the seller's signal is based upon the seller's historical interaction with one or more events, objects or activities that correspond to the behavior of object(s). To obtain the Seller's signal, the buyer must provide a reference point for the seller to create the behavior signal. In this model it is the request of the buyer triggers the exchange of data. For a given reference point, the seller's signal describes a behavior such and such information as the recency and the frequency of the behavior. By way of example and not limitation, a behavior name is illustrated by "Travel-To [Variable]". The buyer initiates the request and seeds the reference point variable for the signal. Each buyer could pay a different price depending on the value they derive from the signal.

Buyer Initiated Event Signal (BIES). Event signals are published by sellers which observe events. For a given buyer initiated event signal, the buyer of an event signal initiates the transaction through a request for objects, or categories of objects from seller that have a relationship to a registered event. The content of the seller's signal is based upon an historical interaction with one or more events, objects or activities that correspond to an event. To obtain the seller's signal, the buyer must provide a reference point for the seller to create the event signal. In this model it is the request of the buyer triggers the exchange of data. A signal request is initiated by the buyer asking the seller if a given reference event has occurred. The signal response can contain information on the event, objects within the event, recency, frequency, location, as well as specifics surrounding the event. By way of example and not limitation, consider "movie purchases in Cincinnati Ohio in last 5 minutes" as a signal request of this type, the seller would respond to this signal with an array of objects each with an recency and frequency, with each element of the array priced depending on the value that the buyer derives from the signal.

Seller Initiated Behavior Signal (SIBS). In this case the seller is initiating (or publishing) that a behavior has occurred to one or more registered buyers. The content of the seller's signal is based upon a current or historical interaction with one or more events, objects or activities which correspond to the behavior of an object. The signals can be published to one or more buyers, and prospective buyers as the activity occurs. Each buyer could pay a different price depending on the value they derive from the signal. By way of example and not limitation, consider "consumer [OBJECTID] is shopping in [Location]" as a signal.

Seller Initiated Event Signal (SIES). Seller is initiating (or publishing) an event to one or more buyers. The content of the seller's signal is based upon a current or historical interaction with one or more events, objects or activities which correspond to the behavior of an object. From a software design perspective, this model is consistent with software based publish/subscribe paradigm. Within commerce signals buyers "subscribe" to an event made known by the seller. Each buyer could pay a different price depending on the value they derive from the signal. The seller initiates the signal, and can communicate specifics about the event. By way of example and not limitation, consider "consumer [OBJECT ID] purchased movie ticket" as a signal which was sent to a multitude of buyers that have agreed to terms and are registered to receive the information. In this case the seller may choose to price the signal differently for each buyer based upon the value that the signal provides toward the corresponding usage of any given buyer.

The signals may be directly derived, constructed, or generated from signal owner raw data and/or synthetic signals may be constructed from at least one signal or a multiplicity of signals, i.e., one or more signals are used to construct additional signals, so the synthetic signals are not directly associated with the underlying raw data. Once again, signals or indicators according to the present invention are generated or constructed from both structured and unstructured data of the signal owner. Note that the method steps of the present invention are made for a multiplicity of signals and corresponding signal owners, in particular in the case of distribution in the context of a virtual marketplace or exchange for signals.

Preferably, after constructing signals, their distribution or sale to buyers is controlled by the signal owner and rules governing seller signals or owner signals that provide for limiting signal availability based upon a rules engine that automatically considers buyer identity, campaign type, signal requested, price, redemption signal type, purchase quantity, past performance of signal, past performance of campaign type, past performance of buyer, and combinations thereof. The rules engine resides within a remote computer of the signal seller and is communicated through a distributed network, either directly and/or within a virtual marketplace having a centralized rules engine governing the management of the exchange of signals for a multiplicity of signal sellers and signal buyers. By way of example and not limitation, a rule could prohibit use of information: by a competitor, or buyers with a poor reputation, or for consumers that prohibit certain buyers and uses.

Signal value cannot be established conclusively independently of a signal buyer's objective and the actual performance of the data within the objective. Additionally the value of any of the signals depends upon signal relevance to the objective based upon a multiplicity of factors, quality of the seller's data, time from last observation and/or interaction, effectiveness of consumer interaction, depth of interaction, consumer feedback, buyer behavior, and/or consumer reputation. The signal seller correlation engines provide options for automatically correlating how the signals or indicators relate to data held within the signal seller to data external to the signal seller. The present invention also provides an embodiment including a method for adjusting the correlation of data with time and with respect to relevance to the objective(s) of buyers. Significantly, regardless of the objectives, generally the value of the signal(s) depends upon the time of the signal construction from an event occurrence, wherein the value of the signal decays over time. Also, the present invention provides for the adjustment of index, correlation, discovery, matching, pricing and calculation economic value of registered signals and their associated decay over time. By way of example and not limitation, consider a signal "Consumer [ID] Purchased Movie Ticket at TIME". This signal has relevance to a buyer's objective which is dependent on time since the observation. In other words a signal has a higher relevance if it is one second old, and a lesser relevance as time progresses. The economic value of a signal is in proportion to its relevance, hence the value of the signal is also higher if the signal is one second old, and a lesser value as time progresses.

Feedback is a form of signal sourced from observers of objects. Observers typically have no need to maintain historical information, but rather report on current object state or activity. By way of example and not limitation, consider a wireless connection providing device such as a Wi-Fi hotspot at LOCATION that has a current request for access from COMPUTER_ID. If the objective of a signal buyer was for COMPUTER_ID presence at LOCATION, then this observation is relevant to the buyer. Additionally, a COMPUTER_ID or device ID, Internet Protocol (IP) address, Media Access Control (MAC) address, or any other type of identifying information is used to identify the device at the location of the Wi-Fi hotspot. Furthermore, the process of receiving feedback from observers, pertaining to object state, activity, performance and behavior, provides a mechanism to assess and adjust performance of marketplace participants, marketplace systems, signals and campaigns operating within a federated data marketplace. And so evolving the at least on signal based upon the feedback received is an additional step in methods of the present invention. Additionally, a signal quality and a signal reputation are automatically generated (by the correlation engine of the signal seller and/or by the signal marketplace or signal exchange) based upon an assessment of signal feedback. The signal feedback may provide information useful for evaluating performance of the signal compared with the buyer's objectives; the virtual marketplace will determine what feedback is relevant toward any objective. By way of example, a correlation engine is described within U.S. Pat. No. 5,504,839 for "Processor and processing element for use in a neural network" by inventor Mobus, filed Aug. 29, 1994, which is incorporated herein by reference in its entirety.

The present invention provides methods for creating signals or indicators by corresponding signal owners, the method steps performed by a signal owner includes: constructing at least one signal associated with a behavior of an object and/or an activity and/or an event associated with the object in a signal owner computer that is constructed and configured for network-based communication with a remote server computer, wherein the value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; generating a first value for each of the at least one signal; and tracking usage of the at least one signal. Also, the at least one signal provides a feedback corresponding to the behavior, activity, and/or the event. Additional steps include indexing the at least one signal; listing the indexed signals in a remote database associated with the remote server computer, communicating the remote index to the centralized data marketplace signal index, wherein the centralized signal index listing provides for automated discovery and matching with buyer candidates having corresponding objectives for buying signals and signals data, wherein the objectives include consumer behavior(s), events, object states, object performance; and updating the listing of the remote and centralized indices by the signal seller or signal owner.

The content of the seller's signal is based upon the seller's interaction with one or more events, objects or activities. Signals are generated or constructed from both structured and unstructured data, which contain records of interaction. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data, unstructured data and external data 360-80 based upon historical patterns, external usage, external feedback, external object observations, locally maintained correlation engines, centrally managed correlation engines, signal response management, and object estimators. While the definition and construction of the signal is at the discretion of the Seller, generally signals conform to a common signal structure whose elements are named and formatted to marketplace conventions for the purpose of creating a common taxonomy for publishing, discover and exchange of signal information. By way of example and not limitation, the taxonomy of the at least one signal includes a signal type selected from the group consisting of: state signals, event signals, activity signals, behavior signals, relational signals, location signals, loyalty signals, purchase signals, social signals, and combinations thereof.

The present invention provides for the signal owner selectively sharing signals information with signal buyers in a virtual marketplace or exchange, wherein the signals information includes a unique identifier associating each signal transmitted by an owner and/or signal seller for exchange with a signal buyer and/or signal data marketplace and agreement within which the data exchange was governed. Preferably, the information shared provides privacy protection for the signal owner and the information contained within the signal. Furthermore, each signal includes and defines the source, the destination, the delivery channel, the method for securing the data, the agreement under which the data is exchanged, a transaction identifier, a transaction time, information necessary to confirm receipt, template which describes the message type, and the payload of the message. In any case, the signals or indicators constructed by the signal seller (signal owner) provide the seller with a mechanism to protect the underlying data from which the signals or indicators are derived. Also, in preferred embodiments, additional privacy protection may be provided by at least one of: screening, anonymizing, and/or using hashed values. For example with hashed values, methods provide for matching credit card objects with MD5 hash of a credit card number allowing signal sellers to identify behavior on the match of hash values versus the match of actual credit card numbers; importantly the MD5 hash cannot be easily reversed (except by NSA). Both entities or parties to the transaction are doing consistent hash, but neither one disclose a number. The same methods and systems are used with email hash; it confirms the match, but only discloses the encrypted information.

Systems and methods of the present invention provide for releasing signal data to a registered buyer based upon an agreement between the signal owner and the registered buyer. Before an agreement is generated, the signal seller retains control of the signal data until after receiving a defined use by a registered buyer, which provides one of the key terms for the agreement. Preferably, the agreement also provides requirements for feedback and/or measurement of objective, such as by way of example and not limitation, to report on a result of use by a registered buyer. Also, the release of the signal data is can be either based upon an observance by the seller, external observers or by a request of the buyer. In another embodiment, the release of signal data is based upon a trigger. Preferably, the release of signal data or signals to registered buyer(s) is automatic based upon detection of the trigger.

The systems and methods of the present invention also provide for automatically confirming receipt of the at least one signal by a destination or signal buyer(s); this step is achieved by automated messaging generated from the buyer computer and communicated automatically through the network to the seller computer directly and/or to the signal marketplace server computer for tracking the distribution of all signals and associated object identifiers based upon unique signal identifiers and the agreements between signal sellers and signal buyers for predetermined uses of the signals.

As set forth in the foregoing, the construction of signals is provided for use between signal sellers and signal buyers via the virtual marketplace through a network for communication between their distributed computers and a remote server computer associated with the virtual marketplace for signals data. The present invention further provides methods and systems for establishing and using a virtual marketplace for value-based exchange of those constructed signals, wherein the value of the signals is determined in the context of willing signal buyers and signal sellers for the signals. The signals of the present invention are derived from data sources that are owned by a multiplicity of entities and/or individuals, and the signals are abstracted from distributed information and data associated with the multiplicity of entities and/or individuals to protect the underlying information and data. Each entity or individual that sells signals data in the virtual marketplace first converts or transforms their unique raw data (or underlying data) into a "signal" or signals, which are indicators associated with object behavior as observed by their respective owners. Importantly, each distributed data source which is a member of the marketplace may make remote indices and correlations available to the virtual marketplace for the purpose of aiding buyer discovery, matching, clearing and settlement, reputation, identifying data leakage, and performance.

The value of any signal cannot be determined separate from one or more buyers, their objectives, and the corresponding use of the signals toward those objectives. Signal sellers create and define rules in which to sell signals. Rules can be based upon requestor, usage, object, behavior, performance, reputation or any other attribute available in the market. By way of example and not limitation, Barclays Bank will only allow consumer travel signals to be used by approved vendors and with explicit consumer permission for hotel reservation use. Buyers have the opportunity to request access to signals within the rules of the marketplace seller, consumer and other regulatory authority. Sellers may choose to accept requests within the terms of an agreement, which is maintained in the marketplace or directly between the two parties. In the case of a signals marketplace or exchange for the signals, the marketplace centralized server computer retains the information on the agreement, signal requests, signal exchanges, feedback, historical data, buyer, seller, seller reputation, signal reputation, price, effectiveness, rules, constraints, and combinations thereof.

According to the present invention, signal creators (signal sellers) or signal owners retain control of their respective data and the signals constructed therefrom, until a registered buyer defines use of the signals, agrees to report on result (by way of example and not limitation, reports on effectiveness for a given use) and other terms, and an agreement is created between buyer and seller. This method for creating and using signals or indicators establishes control, value, and price for those signals between the signal seller and signal buyer(s), and/or the signal sellers and signal buyers who are the participants in a virtual marketplace or signals exchange.

The signal supplier or signal seller (or signal owner) controls how each signal is constructed or generated; the underlying data or information owned by the signal seller may be reconstructed or regenerated into more than one signal for use by third parties for different purposes. Marketplace rules govern construction, transmission and tracking of signal information and the associated object throughout their defined use; this allows signals to be correlated to object behavior. Tying signal performance to object behavior and object events subsequently provides for measurement of value and subsequent market based pricing of signals within the virtual marketplace. Object behavior may take the form of feedback from parties, which are external to any given agreement between buyer and seller. This object behavior obtained from external third party observers inform and correct the correlation of signals to objects and behavior within the marketplace. Importantly this correlation is external to information available to either buyer or seller independently. Third party observers thus participate in the marketplace to provide feedback on objects, which may be covered within a multitude of agreements between a multitude of sellers and buyers. Thus the present invention, provides for the interaction of third party observers both directly to the signal sellers and across the entire marketplace participants. The signal construct defines the source, the destination, the delivery channel, the method for securing the data, the agreement under which the data is exchanged, a transaction identifier, a transaction time, information necessary to confirm receipt, template which describes the message type, and the payload of the message. The construction of a signal by a signal seller will have varying degrees of relevance to any given signal buyer and that buyer's objective, thus the value of the information and data, as well as the signals generated therefrom, will vary with its correlation and fidelity. This provides a natural feedback loop in the virtual marketplace or exchange. Signals that have poor fidelity or poor correlation with an objective will have poor performance, and thus a correspondingly poor price.

Signal sellers have minimal insight into prospective buyers, and the value of their signals in any given context. Visibility is further limited into competing data. For example, if an advertiser intends to sell hotels to frequent travelers of a predetermined destination, they have the choice of seeking information from flight records, geo location, rental car records, credit card issuers, etc., and combinations thereof. Buyers of information also have interests to optimize price for a given performance or quality of correlation. If a signal buyer could obtain geographic location information for $0.05 with a 70% correlation, it may well be a preferred purchase to flight records, which cost $5.00 and have a 100% correlation. Within a signals advertising application embodiment, the signal marketplace provides services to the buyer for directing and optimizing the purchase of signals for targeted advertising, including campaigns across multiple prospective sources, to determine which signals (if any) have relevance to a given advertising campaign, and providing both buyers and sellers with a liquid market in which to exchange, compare, and protect information while providing and purchasing use of the signals within the marketplace or exchange. Significantly, a category of signals that represents real time or near real time activity, events, states and behavior have values that decay quickly with time. In this instance a signal that represents an object's activity one second ago has a greater value than the same signal that is one hour old. The signals marketplace enables the transmission of these real time signals within the rules and constraints of the participants, consumers, marketplace and regulatory authorities.

Furthermore, the marketplace for signals includes a signals index for discovery, tracking and comparing signals and their historical value, reputation and performance. Categories or groups of signals by type, behavior, seller, and usage are also provided. By way of example and not limitation, signals include an expression of frequency and relevance toward an input variable (e.g., affinity to a city, type of food, automobiles, sports, etc.). Also, signal responses are tracked with unique object identifiers which the seller uses internally to uniquely identify a given object. By way of example and not limitation, object identifiers include encrypted forms of e-mail address, phone number, location, loyalty card number, etc. Correlation between signals and their performance is represented by the signal pricing and trading (buying/selling) within the virtual marketplace, third party observers, and/or directly between signal sellers and signal buyers. Additionally, initial rating for expected correlation between signals and their performance is provided by the seller. A new signal will have no historical performance and thus buyers will likely minimize their purchase until the performance can be validated.

In the embodiment having a signals marketplace or exchange, the centralized server computer associated with the signals marketplace maintains a master directory of signals and associated correlations in order to facilitate buyer discovery, matching, clearing and settlement, reputation, identifying data leakage, and performance. Historical performance of a signal, signal seller and third party observer information may be used to update the correlation of signals. Additionally, initial rating for expected correlation of signals to objects, activities, events and objectives is provided by the seller. A new signal will have no historical performance and thus buyers may likely minimize their purchase or until the performance can be validated.

As illustrated in FIG. 1, the flow diagram indicates signal construction or generation method steps. As illustrated in the FIG. 1, the system provides data mining 364 on the unstructured data and data mapping 366 on the structured data. Signals are based on structured 380 and unstructured 370 data; a data correlation engine 360 provides data mining 364 for unstructured data, and data mapping 366 for structured data. The content of the seller's signal is based upon an historical interaction with one or more events, objects or activities that correspond to the behavior of an object. To obtain the seller's signal, the buyer must provide a reference point for the seller to create the behavior data. For example, a signal of AFFINITY_TO_CITY may require input of ID, and CITY NAME. A plane, a phone, a consumer, a computer could all have an affinity to a city. Similarly a phone company, an airline, a rental car company, a bank, a search engine, a restaurant, or similar entity could all have a set of data that would inform the affinity toward a city. The signal seller has multiple options when constructing a signal of "AFFINITY_TO_CITY", sellers could use consumer billing records, flight records, payment records, location records, in sourcing data for to respond to this request. In order to protect consumer information, the signal seller may use any source of information in constructing a response and a signal response is always normalized to be between 0 and 1. For example an airline may use flight information to determine that a consumer has traveled to NYC five times in the last year and has set AFFINITY_TO_CITY for New York equal to 0.5. The value of this information is completely dependent on its accuracy, recency, competing information sources, price and intended use. The marketplace 250 informs the rules and pricing engine 320 of relevant information to set price.

Signal sellers have control over how they sell their signals data within the rules engine 320. These rules can be constructed based on any marketplace attribute. For example if United Airlines bought signals data within the signal marketplace, or directly from signals seller(s), and receives a response from a signals data seller that is a competing airline for a particular traveler, United Airlines could surmise the this particular traveler uses the competing airline for travel to that city and could thus directly market to the that consumer. In one embodiment of the present invention, the signals data seller rules engine 320 is within the control and ownership of the each signal seller and shared with the marketplace so that rules enforcement occur at both the marketplace and remotely with the seller; Significantly, this federated model provides for control of the data by the owner, allowing the marketplace to establish linkage to a multiplicity of federated data owners, with each data owner in control of rules and parameters for the release of information to approved buyers; allowing the centralized market to manage rules during the exchange and provide for clearing and settlement of federated data (signals) for multiple participants and/or multiple federated data sources which act in concert toward a common objectives, with each participant paid based upon value delivered, observed externally or price agreed to. Additionally rules defined by the seller, and transferred to the marketplace may be used to exclude buyers from discovering or requesting purchase of signals which are relevant to their objectives, such as in the case of a competitive use of information.

By way of example and not limitation, the signal marketplace rules include registration of participants, construction of signals, destruction and safeguarding of data, purchase of signals, use of signals, tracking of signal performance, clearing and settlement, marketplace history, tracking reputation of signals and all participants, involvement of non participants, dispute process, participant responsibilities, and other significant areas. Given that the price of signals is unknown to any given buyer, the prospective buyer must first issue a request for quote to a signal seller. The request for quote contains information necessary for the seller to determine price and establish bid-response communication protocol. Sellers respond with a request for quote (RFQ) response or no response. If there is an RFQ response it can include acceptance or alternate terms. Upon receiving the RFQ response the buyer may propose alternate terms until an acceptance is issued by the seller via the network-based communications between distributed computing devices. Upon receiving the accepted RFQ message from the seller, the buyer issues a binding purchase confirmation after which the seller confirms receipt and respond with the delivery of the signal(s) in the timeframe specified. The marketplace subsequently registers this agreement with a contract management system. Signals can be transmitted within the terms defined within the registered contract or purchase confirmation. By way of example and not limitation, signal pricing can consist of both fixed price and price based upon an objective measured within the marketplace. The marketplace embodying the invention provides an anonymous trading system having a communicating network for transmitting electronic messages between distributed computers of signal sellers and signal buyers. A plurality of order input devices such as buyer and seller terminals are connected to the communication network. Each signal order device may generate price quotation messages, which include bid and/or offer prices and may communicate estimated price and analytics information to a buyer. A plurality of seller rules and pricing engines are connected to the network, to match bids and offers the marketplace execute deals and records transactions where matches are made. At least one of the matching engines has an associated market publisher 400 (illustrated in FIG. 2), which with the signal will be distributed and tracked.

Trackable behaviors are defined within the marketplace and may include by way of example and not limitation: purchase with one time use code, purchase with credit card, location, registration, viewing of a web site, opening of email, phone call or viewing of a television show or commercial. Marketplace rules require participants to record defined behaviors and object identifiers, which are correlated to a signal, object, event or behavior.

Within the signals marketplace or virtual marketplace or exchange, signals from multiple sources can be combined to identify objects. Similarly, object correlation to other objects, object correlation to behaviors, object correlation to events, object correlation to states, are tracked so that the marketplace requests will match corresponding data. By way of example and not limitation, objects such as: a person, a car, and a computer can all be correlated. Each of these objects can also have behaviors that can be correlated using a correlation engine, which may be provided in the centralized server computer or distributed among computers in communication over a network.

By way of example and not limitation if the signal AFFINITY_TO_CITY (New York) was combined with AFFINITY_TO_THEATER the target audience of likely Broadway ticket purchasers could be developed. A statistical engine within the marketplace cross correlates signal performance for any given objective. The statistical engine assesses the performance of signals both in isolated and combined usage, thus retaining the ability to assess value for a single signal within the marketplace and its participants. In addition to combining signals, the marketplace statistical engine also includes random samples of other signals. Thus, signal sellers are required to support analytics driven requests for their signals data to assess the cross correlation of signals. Random sampling is also used to assess the performance the unique performance of specific signal types, and identify and or update correlations, prediction, estimations and interdependencies of signals, object, events and behaviors. In this way the random samples allow the marketplace to update correlations and indices to may make automated suggestions of alternate data sources which may improve price-performance of a given objective. When two or more signals are used toward an objective it is statistically necessary to vary the use of signals in order to properly calculate their performance, covariance and other correlations. The marketplace varies use of signals by altering their content, weighting, and presence or adding other signal information. By way of example and not limitation, an Italian restaurant wishes to advertise after the showing of a movie at a movie theater. The movie theater has a signal LEAVING MOVIE THEATER for a given object, or consumer. The campaign manager that manages the advertising campaign for an Italian restaurant finds the movie theater signal of use, but must gain additional information to determine which consumers leaving the movie theater prefer Italian food. The campaign manager requests AFFINITY to ITALIAN FOOD for a given object or consumer from the consumer's bank and the same signal from an Italian Food magazine. By varying the AFFINITY to ITALIAN FOOD use signals from the bank and the magazine, and including random signals, the statistical performance, correlation, and covariance of the bank signals, the magazine signals, and other prospective signals can be easily calculated within the marketplace analytics.

Figure 2:
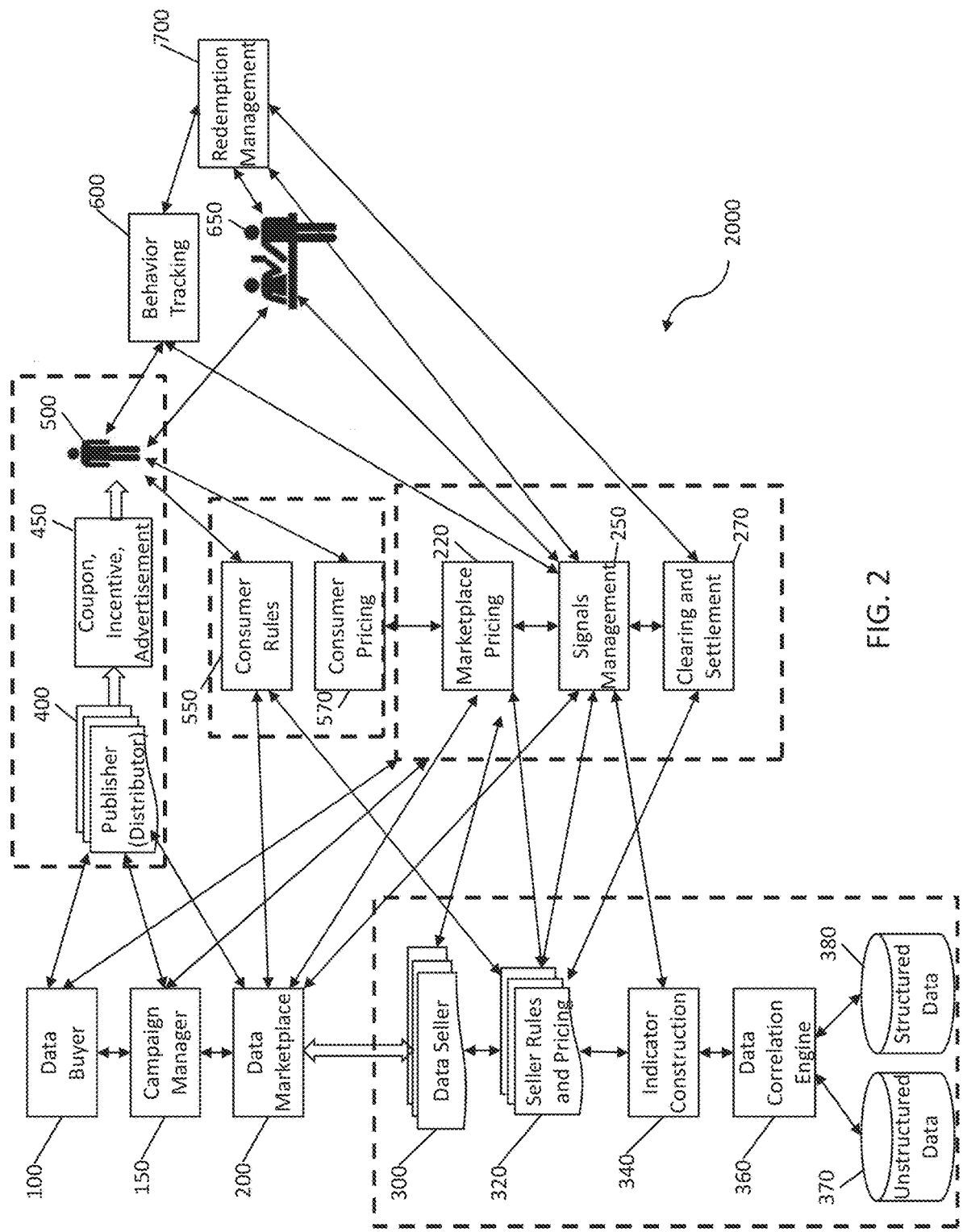
FIG. 2 is a schematic diagram of an embodiment of the invention.

As illustrated in FIG. 2, the schematic diagram illustrates components within a signal marketplace and/or exchange of signals between signal sellers and signal buyers, and methods or processes associated with their interaction.

Federated Data Centralized Intelligence. With any given seller correlations can be held remotely with object behavior and state estimated from both internal and external data. Significantly, this remote data correlation is shared with the centralized marketplace to assist with buyer discovery and object feedback. This approach allows each signal seller to control their data within their own environment, and perform analysis locally to provide a standardized result set to data buyers. This standardized result set provides security to the owner of the data as to not allow unapproved usage and further dissemination. The result set and marketplace allow for the tracking of the benefit that this indicator provided to a given objective (example: marketing campaign). It also allows the seller to control the price of the response based upon the benefit to which it provides, understanding that it will provide different benefits to different buyers and different usages.

The computer-implemented method for indexing distributed data in a distributed data network in which file metadata and signal types related to unique keys are temporarily centralized within a marketplace. The method of invention calls for assigning and using a unique key to identify signals, which correlates to the key and returns it to the marketplace where it can be combined with other data sources. A key-value store built up in rows for the marketplace metadata, and updated by each node through response and direct participant edits. Each of the rows has a composite row key and a row value pair, also referred to herein as key-value pair.

Also, as illustrated in the figures, in particular in FIG. 1 and FIG. 2, a method of construction of signals/indicators directly between signal sellers and signal buyers and/or within a data marketplace to express: recency, frequency, and affinity of a given input value is illustrated (generally referenced 2000 in FIG. 2), including the following:

Pricing signals data (signals) within a market of buyers and sellers based upon performance of indicators toward an objective.

A self-organizing network for exchange of signal information between signal sellers and signal buyers.

A method of using data indicators from one or more sources each source priced separately within a data marketplace 200 to target consumers in campaigns operating through one or more advertising publishers 400. (Advertiser 100, Campaign Manager 150, Signal Data Marketplace 200, Signal Management 250, Publisher (Distributor) 400), in particular for campaign management, which may further include consumer 500 permissions including Consumer Rules 550 and Consumer Pricing 570, and other Seller-based components 300, including Seller Rules and Pricing 320, Signal or Indicator Construction 340, Seller Data Correlation Engines 360-40, External Data Access 360-80, Seller Unstructured Data 370, and Seller Structured Data 380).

The present invention systems and methods may further include the following: Performance based advertising within a signal data marketplace 200 with publishing targeted and traceable advertising based upon information sourced from the signals marketplace or exchange. Examples of traceable advertising include one time use codes, coupons, discounts, loyalty, digitally stored incentives, and combinations thereof 450.

Registration of signal providers (data sellers) in a shared directory 200-300.

Registration of signal types offered by signals providers in a shared directory 300, 320, 340, 360.

Registration and participation of advertisers (signal buyers) in a signals marketplace or exchange 100, 150, 200.

Registration and participation of content distributors in a signals marketplace or exchange 400, 200.

Registration and participation of consumers in a signals marketplace or exchange 500-550, 200.

Method of governing exchange of consumer information within a data marketplace that is dependent on consumer permission and consumer defined fees 550-200.

Rules governing the exchange of signals in a marketplace 200.

Creation of advertising campaigns using distributed signals, i.e., wherein the signals are provided from different sources.

Method of automated signal selection within a data marketplace, based upon signal price performance and relevance.

The Method of communicating signal performance and pricing information within a marketplace (marketplace analytics 250).

The method of purchasing signals via dynamic pricing in a bid/response marketplace 220.

Method of tracking the performance of federated indicators/signals within a data marketplace, based upon behavior (e.g. web site visit), location, card transaction information, redemption codes, loyalty cards.

Method of pricing indicators within a data marketplace based upon behavior 600 web site visit, social sharing, location, card transaction information 650, redemption codes, and loyalty cards, as illustrated in FIG. 2.

Method of settling payment between buyer and seller 700, 320, 270, 150, 100 based upon redemption, coupon, one time code, payment, location, registration or other purchase information to confirm consumer behavior within a distributed data marketplace.

Identification of consumer marketing channel preference through signal availability, point of sale purchase information and other redemption information.

Use of consumer location information to inform effectiveness of advertising within a signals marketplace.

Use of encrypted credit card to confirm purchase within an advertising campaign.

Use of encrypted consumer ID within retailer purchase history to confirm purchase within an advertising campaign.

Technical interaction and message exchange between signal buyers and sellers.

Process of exchanging requested purchase of data from a data provider within a data marketplace.

Statistical method for optimizing signal selection for advertising campaigns operating with a signals marketplace or exchange.

Statistical method for optimizing advertising distribution channel based upon signal information.

Method of defining campaign types supported by signal marketplace. Campaigns can begin with a target or campaigns can be managed by distributor in a bid for consumer access by competing campaigns.

Protection of consumer information in a shared signals, and further including steps for protecting consumer anonymity in the exchange of signal information.

Clearing and settlement of signal exchange between participants in a marketplace based upon signal purchase agreements and signal performance information.

Method restraining signal exchange through rules based upon local laws of each transaction participant.

Method of selling indicators through marketplace agreements with price based upon advertising performance.

Method of Sharing revenue for consumer purchases with signal providers based upon measured consumer behavior 600.

Method of Settlement of financial obligations in a data marketplace which may include consumer behavior, consumer payment, seller flat fees, seller performance fees, and consumer revenue sharing 270.

Figure 3:
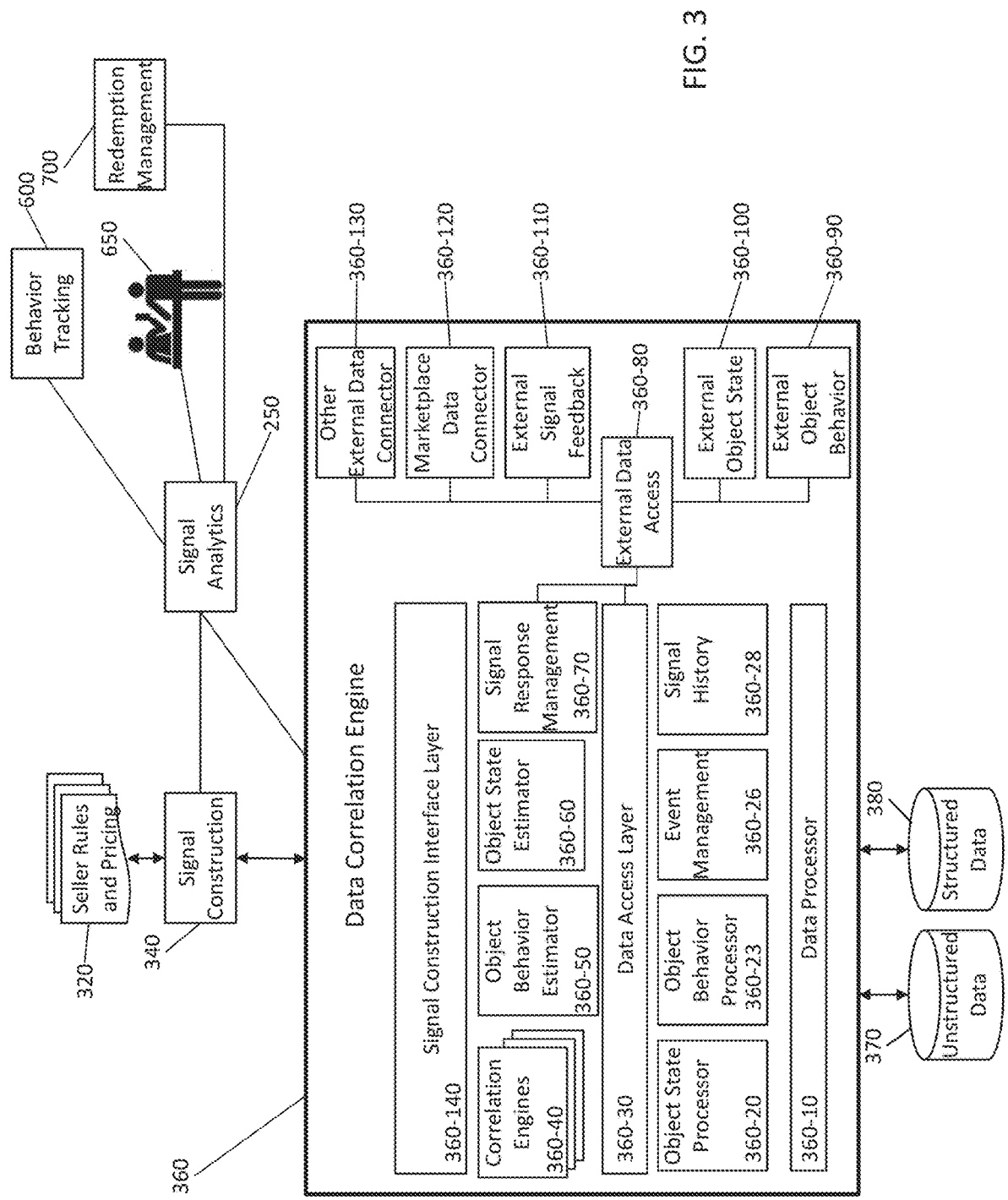
FIG. 3 is a schematic diagram of an embodiment of the invention.

Referring now to FIG. 3, a signal data correlation engine 360 is illustrated including the components of a signal correlation interface layer 360-140, a signal data access layer 360-30 and a data processor 360-10; wherein the signal correlation interface layer 360-140 further includes: a commission engine 360-40, an object behavior estimator 360-50, an object state estimator 360-60, a signal response management 360-70 having external data access 360-80. The signal data access layer further including an object state processor 360-20, an object behavior processor 360-23, an event manager 360-26, and signal history 360-26. The external data access is further related to external signal feedback 360-110, a marketplace data connector 360-120, an other external data connector 360-130, an external object state 360-100, and an external object behavior 360-90. The signal construction 340 from unstructured data 370 and structured data 380 also relates to the signal/seller data correlation engine 360 and seller rules and pricing 320. Signal analytics 250 is related to the data correlation engine 360 as well as behavior tracking 600 of behavior (including by observer) 650 and in the case of advertising, redemption management 700.

Figure 4:
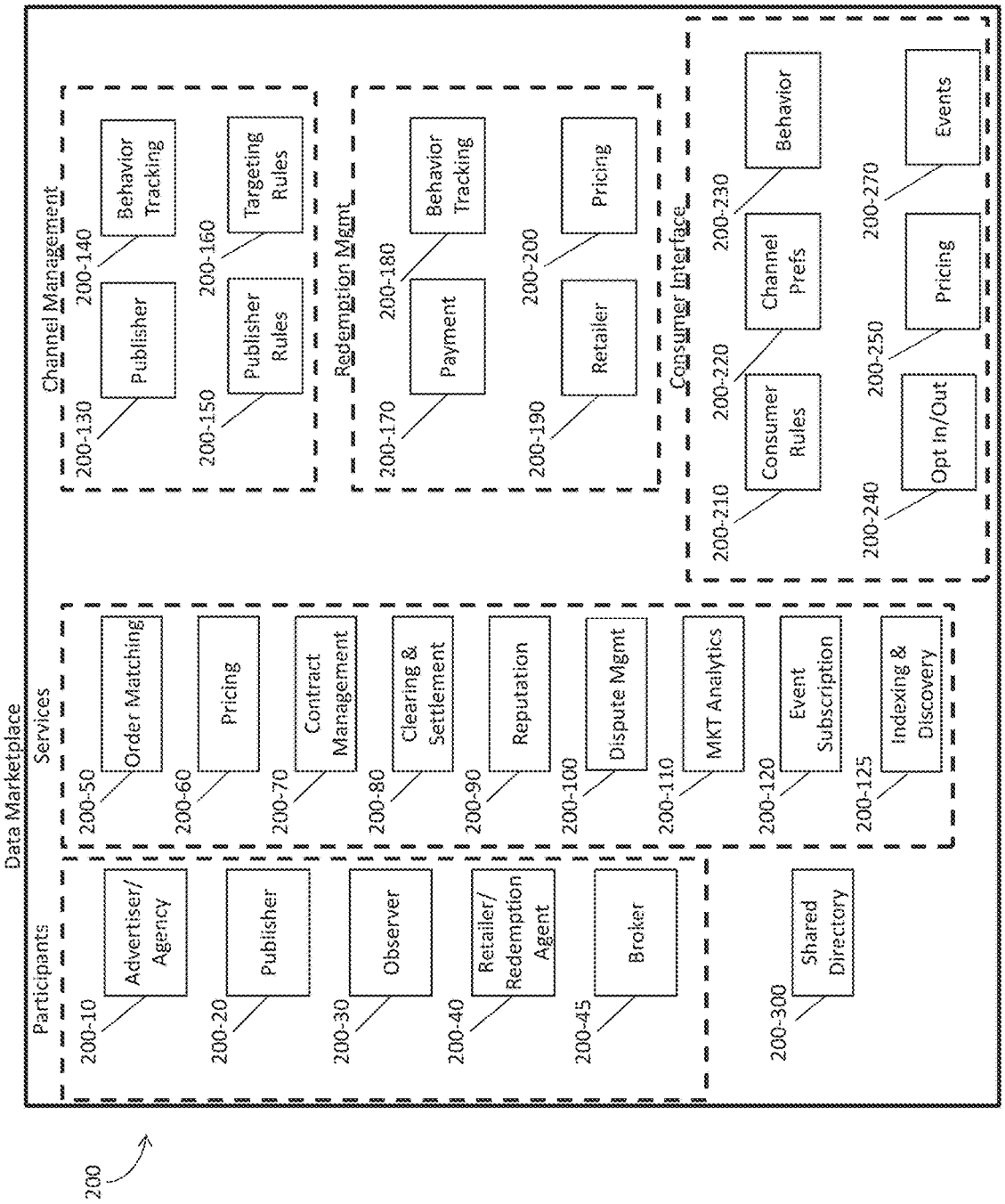
FIG. 4 is a schematic diagram of an embodiment of the invention illustrating components and functions of the signals data marketplace.

Referring now to FIG. 4, the signal data marketplace 200 is illustrated, providing components and relationships for participants, services, channel management, registration management, and consumer interface. For the participants, general examples are illustrated for an advertiser and/or agency 200-10, a publisher 200-20, an observer 200-30, a retailer and/or redemption agent 200-40, and a broker 200-45. For the automated services provided by the remote/centralized server computer for the virtual signal marketplace or exchange, examples are illustrated for order matching 200-50, pricing 200-60, contract management 200-70, clearing and settlement 200-80, reputation 200-90, dispute management 200-100, market analytics 200-110, event subscription 200-120, and indexing and discovery 200-125. For channel management provided by the virtual signal data marketplace 200, a publisher 200-130, behavior tracking 200-140, publisher rules 200-150, and targeting rules 200-160 are provided for automated steps within the signals marketplace or exchange. Functions of redemption management further include payment 200-170, behavior tracking 200-180, retailer 200-190, and pricing 200-200. Functions of consumer interface provided by the virtual signal marketplace include consumer rules 200-210, channel preferences 200-220, behavior 200-230, opt in/opt out 200-240, pricing 200-250, and events 200-270.

Figure 5:
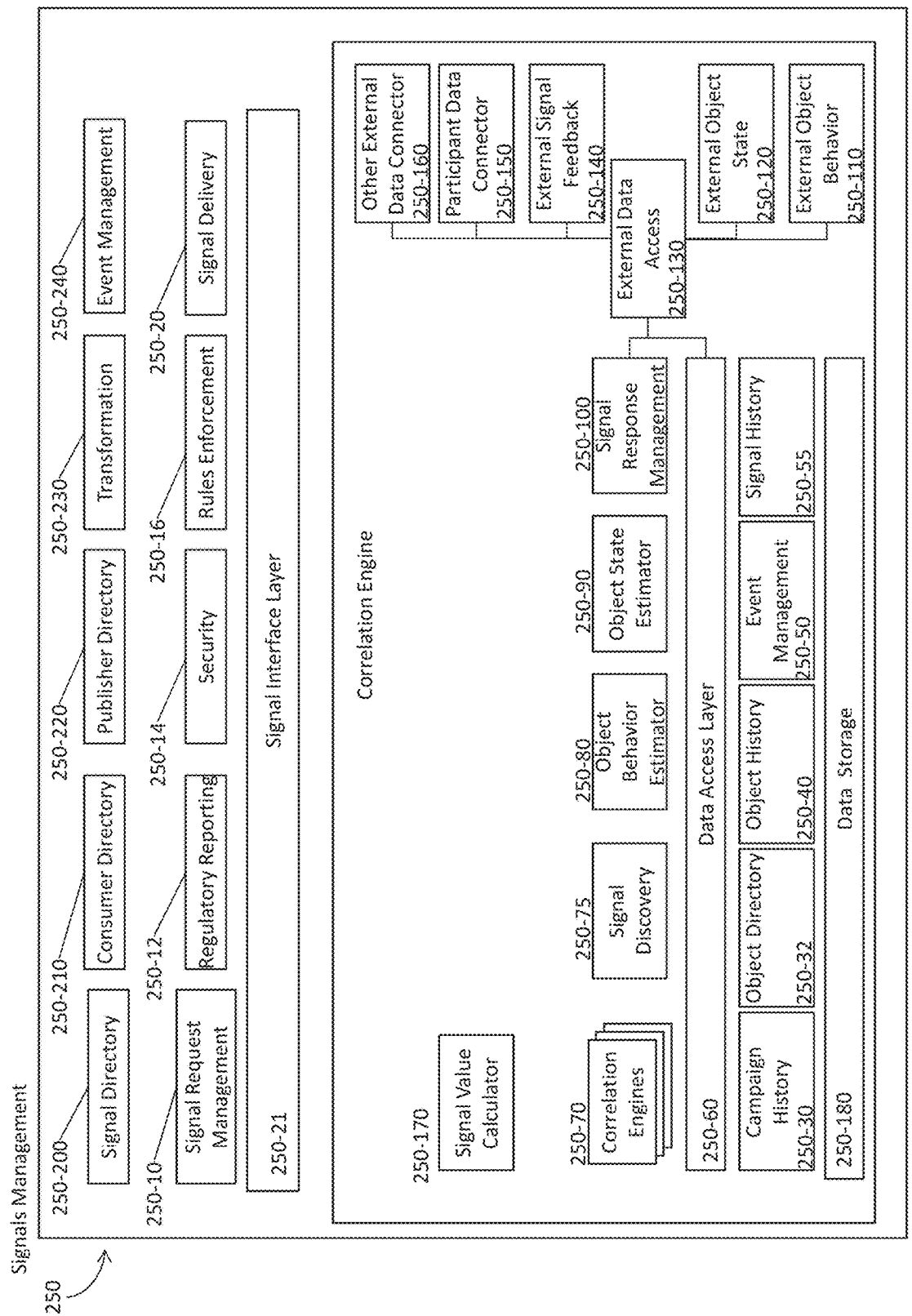
FIG. 5 is a schematic diagram of an embodiment of the invention illustrating components and functions relating to signals management.

FIG. 5 is a schematic diagram of an embodiment of the invention illustrating components and functions relating to signals management, generally referenced 250. The components include: Signal Directory 250-200; Consumer Directory 250-210; Publisher Directory 250-220; Transformation 250-230; Event Management 250-240; Signal Request Management 250-10; Regulatory Reporting 250-12; Security 250-14; Rules Enforcement 250-16; Signal Delivery 250-20; Signal Interface Layer 250-21; and a Signal Management Correlation Engine further including 250-170; Correlation Engines 250-70; Signal Discovery 250-75; Object Behavior Estimator 250-80; Object State Estimator 250-90; Signal Response Management 250-100; External Data Access 250-130; External Object State 250-120; External Object Behavior 250-110; Other External Data Connector 250-160; Participant Data Connector; 250-150; External Signal Feedback 250-140; and Data Storage 250-170.

The object behavior estimator uses one or more statistical engines to predict behavior of an object to external signals (which represent events or stimuli). Objects such as people have a current state (in transit, having a baby, sitting at home) and historical behavior patterns that are both dynamic and complex. For example, historically when a person (Joe) travels to Chicago he has historically flown by united airlines, stays at a Marriott, and eats at a steak chain restaurant for dinner. This information is held by many observers such as airlines, credit card companies, hotel chains, mobile phone companies, etc. Thus the object Joe has behaviors that are correlated to travel to Chicago.

Observers which sell their observations in the data marketplace are signal sellers. There are two primary flows by which signal sellers (or signal owners) interact with a signal buyer: Buyer Initiated Request for Signal, and Seller Initiated Signal.

A Buyer Initiated Signal typically requests predict behavior of an object from historical observation information. For example the signal request of affinity to City, with the object context of the city of Chicago for object Joe, could be sent to an Airline Observer. In this example, the airline observer would correlate their historical travel data on passenger travel to Chicago for object Joe and return information regarding the recency and frequency of Joe's travel to Chicago. An Object Behavior Estimator could further predict the future travel based not only on an Airline observer's historical data, but their data correlated to external data such as a business conference, or another objects actions and behaviors (example Joe always travels with Susan to Chicago). Within the distributed (or federated) signals marketplace, each observer retains the correlation to external data signals, not based upon the data itself. For example the correlation engines for the airline above would hold both internal correlation of Joe's travel preferences toward an external signal request, and the correlation of airline data to other external objects and behaviors (Susan's travel and conference events). The airline would not know the identity of the object Susan, but only that there is a strong correlation to an external object behavior (Susan is traveling to Chicago). Neither would the airline know that the external event was a specific conference. To summarize, the statistical machines within the data correlation engines and the estimators provide correlation of internal data to external objects and behaviors. These correlations allow for prediction of current state and behavior to external stimuli, with external information protected by the signals construct.

In a Seller Initiated Signal, the observation signal has buyers that have registered for the observation, without historical context. In this model it is the buyer that has correlated an external signal (from the seller) toward an objective. An example of a Seller Initiated Signal is an Airline with a signal Airline-Ticket-Purchase by Object at Time. In this example, the Seller Initiated Signal is an Event, which one or more buyers have chosen to register for within the Signals Marketplace, and the Seller has agreed to terms, which are contained within the Marketplace Contract Management System. For example, when Joe purchases an airline ticket, the Airline (acting as Signal Seller) informs approved signal buyers Marriott and Hilton that Joe will be travelling to Chicago. Event signals are a primary real time mechanism for selling and transferring observations. The signals marketplace provides for the dissemination of approved real time data within the signals metaphor to protect the contents of the information (or underlying data), its usage and performance, and realize value of the information based upon time decay. The signal Purchased-Airline-Ticket has a higher value within 1 second of the event, than at 10 minutes, 10 hours, or 10 days. The marketplace provides for price prediction based upon the time decay, and for measurement of performance of the event signal during its use. For example, if the hotel chain Hilton was able to use the signal Purchased-Airline-Ticket to secure a reservation by Joe, where Joe had previously stayed at Marriott, Hilton received a known value in the incremental sale of that Chicago room. If the Signal Purchased-Airline-Ticket was the only signal used in an advertising campaign (or "campaign") to Joe, than the performance of the signal toward the objective is known. If Purchased-Airline-Ticket was used in conjunction with other information the marketplace will calculate the proportional effectiveness of the Airline signal in the context of other signals used.

Figure 6:
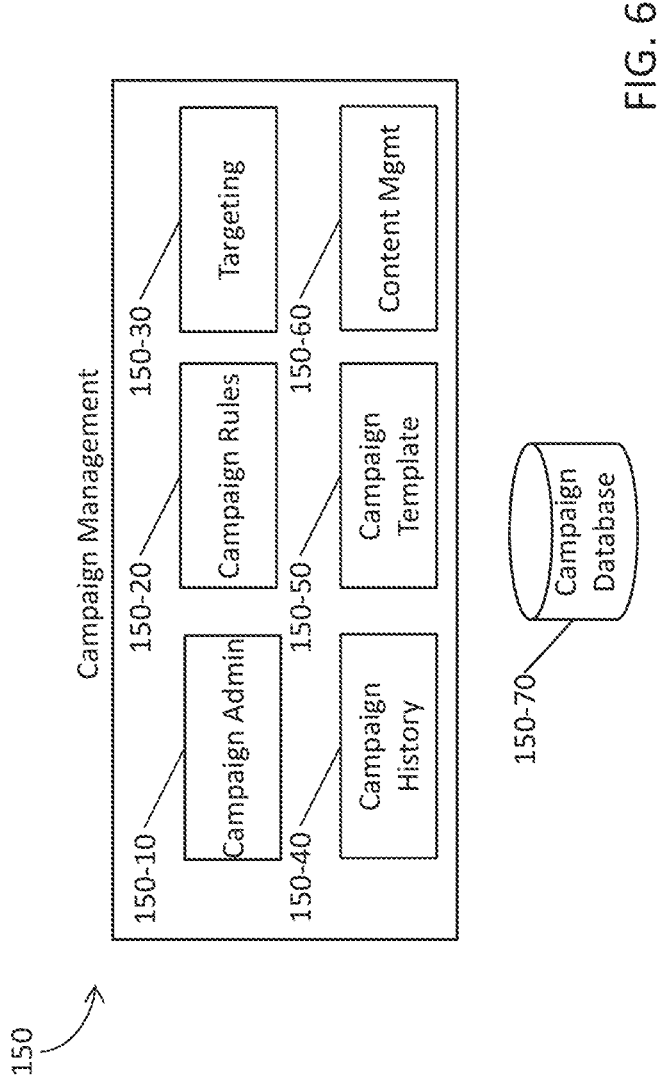
FIG. 6 is a schematic diagram is a schematic diagram illustrating campaign management for signals in advertising.

FIG. 6 is a schematic diagram is a schematic diagram illustrating campaign management for signals in advertising. Campaign management, generally referenced 150, further includes the components and functions of an advertising campaign and its management: campaign administration 150-110; campaign rules 150-20; targeting 150-30; campaign history 150-40; campaign template 150-50; content management 150-60; and campaign database 150-70. Embodiments of the present invention for using signals in advertising and advertising campaigns further include: statistical methods for optimizing signal selection for advertising campaigns operating with a signals marketplace or exchange; statistical methods for optimizing advertising distribution channel based upon signal information; and/or methods of defining campaign types supported by the signal marketplace, wherein advertising campaigns can begin with a target, or advertising campaigns can be managed by distributor in a bid for consumer access by competing advertising campaigns.

In one embodiment of the present invention, a method is provided for using signals in advertisement that includes the steps of: providing at least one signal for use in advertising, wherein the signal(s) originate from and are controlled by corresponding signal owners; providing and storing a signal index in a centralized database wherein the signal index is usable by prospective buyers to identify signals that may be relevant toward a given objective in at least one advertising campaign; transmitting the at least one signal to at least one signal buyer for the predetermined signal usage in the advertising campaign(s) wherein the predetermined signal usage includes the at least one advertising campaign.

Additional steps may further include: optimizing the signal selection by the buyer(s) of the at least one signal for the predetermined signal usage in the advertising campaign(s) based upon the objectives of the buyer(s), wherein the optimizing step includes consideration of optimizing factors selected from the group consisting of: a signal price, signal correlation, a signal reputation, a signal performance, a signal owner reputation, and combinations thereof, wherein the signal buyer determines the optimization factors for the at least one signal based upon the at least one advertising campaign, and wherein the optimizing step includes factors of: predictive accuracy, fidelity, relevance to an objective, near-real-timeliness, frequency, recency, relationship of the source of the signal, reputation of the signal, reputation of the seller, affinity to a target, and/or usefulness to an objective associated with the at least one advertising campaign; the signal buyer(s) creating the advertising campaign using the at least one signal; tracking the performance of the at least one signal in the advertising campaign(s), wherein tracking occurs through feedback obtained by observers, which may include publishers, retailers, consumers, payment companies, and/or other third parties; automatically correlating the effectiveness of the advertising campaign using the at least one signal, wherein the correlating step includes an object correlation to other objects and/or object behaviors to other objects and/or a signal correlation to other signals; of providing feedback on the signal usage in the advertising campaign; automatically matching the at least one signals with advertising campaigns for signal buyers, based upon the signal index; providing the signal index for use in signal discovery and selection for advertising campaigns operating within a virtual marketplace for signals; providing a redemption signal associated with at least one advertising campaign; optimizing signal selection for use in advertising campaigns and advertising distribution channels based upon signal information provided by the corresponding signal owner(s); receiving buyer goals for advertising campaigns using the signal(s); estimating demand for products and/or services based upon the signal(s); automatically estimating a market size and/or a market type based upon the at least one signal; automatically generating a market size and a consumer profile based upon the at least one signal and its use in the advertising campaign; linking the indexed signals to relational databases associated with marketing and/or advertising; updating the signal index; and/or determining which observers have data relating to any specific object associated with the signals.

In another embodiment, the present invention methods using signals in advertising, and more particularly, methods for creating and using a virtual marketplace for valuing and selling signals generated from distributed data sources that are controlled by a multiplicity of owners for use in advertising campaigns, include the following method steps: providing at least one signal from a first data source and at least one signal from a second data source to a remote server computer for a signal marketplace or exchange; generating an index and a listing in a centralized database; wherein the signals originate from different distributed data sources controlled by different owners and the signals are indexed and listed in a centralized database and each of the indexed signals is linked to corresponding relational databases; and using the signal index for automated signal discovery and selection for advertising campaigns operating within a virtual marketplace for signals.

Additional method steps in embodiments of the present invention further include: optimizing signal selection for use in advertising campaigns and advertising distribution channels based upon signal information provided by the corresponding signal owner(s); monitoring performance of the at least one signal compared with a corresponding objective associated with advertising campaigns; automatically determining a relevance to an objective associated with the at least one advertising campaign for the at least one signal based on comparison with consumer feedback and consumer behavior; limiting signal availability based upon a rules engine that automatically considers buyer identity, campaign type, signal requested, price, redemption signal type, purchase quantity, past performance of signal, past performance of advertising campaign type, past performance of buyer, and combinations thereof; automatically correlating how the value of the information decays over time and with respect to relevance to the objective of the advertising campaign(s); generating a value of signal relevance to the objective based upon consumer feedback, buyer behavior, and/or consumer reputation; receiving feedback from the buyer regarding qualities of relevance, correlation, and/or strength of the at least one signal; receiving inputs from third party observers that inform the efficacy of signal use for the advertising campaign(s) and correlation across a multitude of participants and multitude of signal uses; automatically generating by the virtual marketplace a signal quality and a signal reputation based upon an assessment of signal performance compared with an objective of the at least one advertising campaign; and automatically matching the signals with buyer candidates having corresponding objectives for buying the signals for use in advertising campaigns, and wherein the objectives include consumer behavior(s) to be influenced by advertising.

In embodiments of a system for providing a signals marketplace in a virtualized computer network for using signals with advertising campaigns, the following components and their relationships are provided: a remote server computer constructed and configured in network-based communication with a centralized database further comprising at least one index for signals data for use in advertising campaigns, and operable to automatically generate an assigned value corresponding to each unique signal in the indexed signals data; the indexed signals data being generated from receiving at least one signal from a first data source and at least one signal from a second data source, wherein the signals originate from different distributed data sources controlled by different owners; wherein each of the signals has a corresponding assigned value stored in the central database and associated with its indexed corresponding signal; and, wherein each assigned value is based on at least two factors is dependent upon a signal source value and a signal destination value corresponding to objectives for using the at least one signal in advertising campaign(s). Preferably, the remote server computer automatically tracks the signals data source information and how it is correlated to an objective associated with at least one advertising campaign.

The signal index is used for automated signal discovery and selection for advertising campaigns operating within a virtual marketplace for signals. Signal selection for use in advertising campaigns and advertising distribution channels is optimized based upon signal information provided by the corresponding signal owner(s). Signal types include event signals, activity signals, behavior signals, relational signals, location signals, loyalty signals, purchase signals, redemption signals, and/or social signals. The value of the signal(s) includes relevance to at least one buyer for objectives associated with at least one advertising campaign. The value of the at least one signal may be correlated with an estimated demand for products and/or services by the signal owner and/or at least one consumer. Also, interaction of third party observers may inform the efficacy of signal use for the at least one advertising campaign and/or correlation across a multitude of participants and multitude of signal uses.

By way of additional background for the signal marketplace of the present invention, it is a significant factor how the federated data for the distributed signals is used. As opposed to "sharing lists" and joining information within a single database. Federated data keeps raw data localized with the owner responsible for disclosure, usage, pricing, security, and privacy. Within a data marketplace federated data providers (sellers) use signals as a way to protect sensitive information. Signals (or indicators described hereinabove) are a type of meta data indicators that are based upon information in control of the data sellers. These signals or indicators require input context and are sold for purposes explicitly defined within the signal marketplace. For example, in an AFFINITY_TO_CITY signal example, consumer flight records are never shared nor is the traveler's current location, rather the signal response can reflect how often or how recently an object was associated with a given city. Signals create scarcity and enable control both of which are critical in any functional marketplace. The value of any good is dependent on quality, availability, use, alternatives and price. The virtual signal marketplace performs analysis on signal results to determine effectiveness and value with respect to the objectives of the buyer(s) and advertising campaigns. This information is communicated to all participants, which informs the market of potential buyers and sellers.

In order for a signal to be controlled, the following factors or considerations are required: a) the signal's owner must have sole discretion on access and dissemination; b) the underlying data or information associated with the signal must also be controlled, since there can be no efficient market for the data or signals if they can be obtained elsewhere at a lower cost; c) a signal request must contain information for the owner to release, which includes information on the buyer, status of agreement with marketplace, agreement with the buyer (if any), consumer constraints (if any), price offered, planned usage, and combinations thereof; the marketplace processes, systems, and services to protect the exchange, assure secure delivery, track usage, track value generated, settle funds, issue receipt, deliver auditability; and combinations thereof.

There are different control requirements on "consumer information" (or personally identifiable information or PII), proprietary information, object behavior information, object state information and other generic information. Some of these control requirements are driven by regulatory issues or requirements. Some information can only be exchanged to another party where an agreement is in place (i.e., a closed market). The control elements of a signal include the following: a) Signal type: Open, Restricted, PII; b) Signal Price: Market, floor; value generated c) Buyer Information or profile; c) Consumer consent information (if any).

After defining the signals to sell, and registering their corresponding rules and constraints, signals information is exchanged within the virtual signal marketplace. There are five (5) primary data flows between a signal provider and the signal marketplace or signal exchange, including:

1) RFQ. Request for quote. In this data flow, a prospective buyer will request a price from signal provider. The signal buyer provides: ID, signal(s) requested, input parameters (e.g., destination city, campaign type, price offered (per item and per success), time, expiry time, minimum fill, maximum, settlement. Along with this information the signal marketplace or signal exchange will also provide Buyer ID reputation information.
2) RFQ Response. Signal provider will either respond with an acceptance of order and time/quantity to fill, or a respond with alternate price/denial. The signal marketplace or signal exchange provides "optional" seller side software to manage this interaction. Rules surrounding minimum price, data effectiveness and buyer ID are incorporated to response. If offer is accepted, signal marketplace or signal exchange will begin tracking of the transaction order.
3) Purchase Confirmation. Buyers will issue purchase confirmation for approved RFQs. Within our marketplace agreement, a purchase confirmation is a commitment by the buyer to pay for information within the terms of the Commerce Signals Marketplace Agreement.
4) Signal Delivery. Signal provider provides the signals and buyer confirms receipt
5) Settlement. Transaction Reference number, quantity provided, time provided, item fees (if any), redemption fees (if any), redemptions to date, redemption expiry period, amount paid, amount paid to date, dispute reference numbers, receipt confirmed.

The present invention creates a virtual market for data, wherein the underlying or actual data has been transformed into signals or indicators to protect the underlying data, while still providing information relating to the data that is actionable by signal buyers. Each data seller can develop their own signals or indicators, controlled by their own rules and corresponding correlation engine(s), which data they wish to sell to the outside world. For example a retailer could develop a signal "affinity for golf" with a result of 0-1. Consumers who buy golf balls, golf equipment would have a stronger signal based upon affinity. Golf marketers could subsequently use this information to better inform advertising, in particular for targeted advertising campaigns.

Signal buyers participate directly with signal sellers and/or in the marketplace to identify objects that they wish to influence or measure. Other entities, such as campaign managers, publishers, media companies take different roles in the measurement and influencing of the behavior of objects through the use of signal information. The virtual marketplace supports both buyer led transactions and seller led transactions. By way of example and not limitation seller led campaigns can begin with a publisher that has a relationship with a consumer of a given profile. Buyers can bid for the influencing the behavior of that consumer through the marketplace. Marketplace participants can assume multiple roles such as buyer, seller, and distributor.

Regardless of signal or indicator construction, signals must be registered to participate in the signal marketplace. To provide security to protect the signals within the marketplace, and to control signal dissemination or access and distribution to signals registered in the signal marketplace, multiple object identifiers can be used. By way of example and not limitation these include encrypted forms of e-mail address, card number, phone numbers, device ID, location, loyalty card and address as key for purchase of information from a seller. Thus the data seller or signal provider controls the information that is shared within the marketplace and with prospective buyers. These controls relate to access, viewing, downloading, copying, etc. and combinations thereof.

Technical communication protocols for signals include writing data of the buyer into a buyer computer application; notifying buyer computer application to send XML file when data has been written to the marketplace order computer application data file by the buyer computer application; monitoring the marketplace order computer application queue from the marketplace execution application for notification that data has been written to the data file by the buyer computer application; reading the data of the buyer computer application data file from the marketplace execution computer application upon detection of notification; notifying marketplace order computer application to send XML file when data has been written to the seller computer application data file by the marketplace order computer application; monitoring the seller computer application queue from the marketplace order application for notification that data has been written to the data file by the marketplace order computer application; notifying a buyer computer application read file when data has been read by the seller computer application from the marketplace order computer application data file; monitoring the seller read file from the marketplace order computer application for notification that data has been read from to the buyer computer application data file by the seller computer application to initiate further writing to the marketplace order computer application data file.

Figure 7:
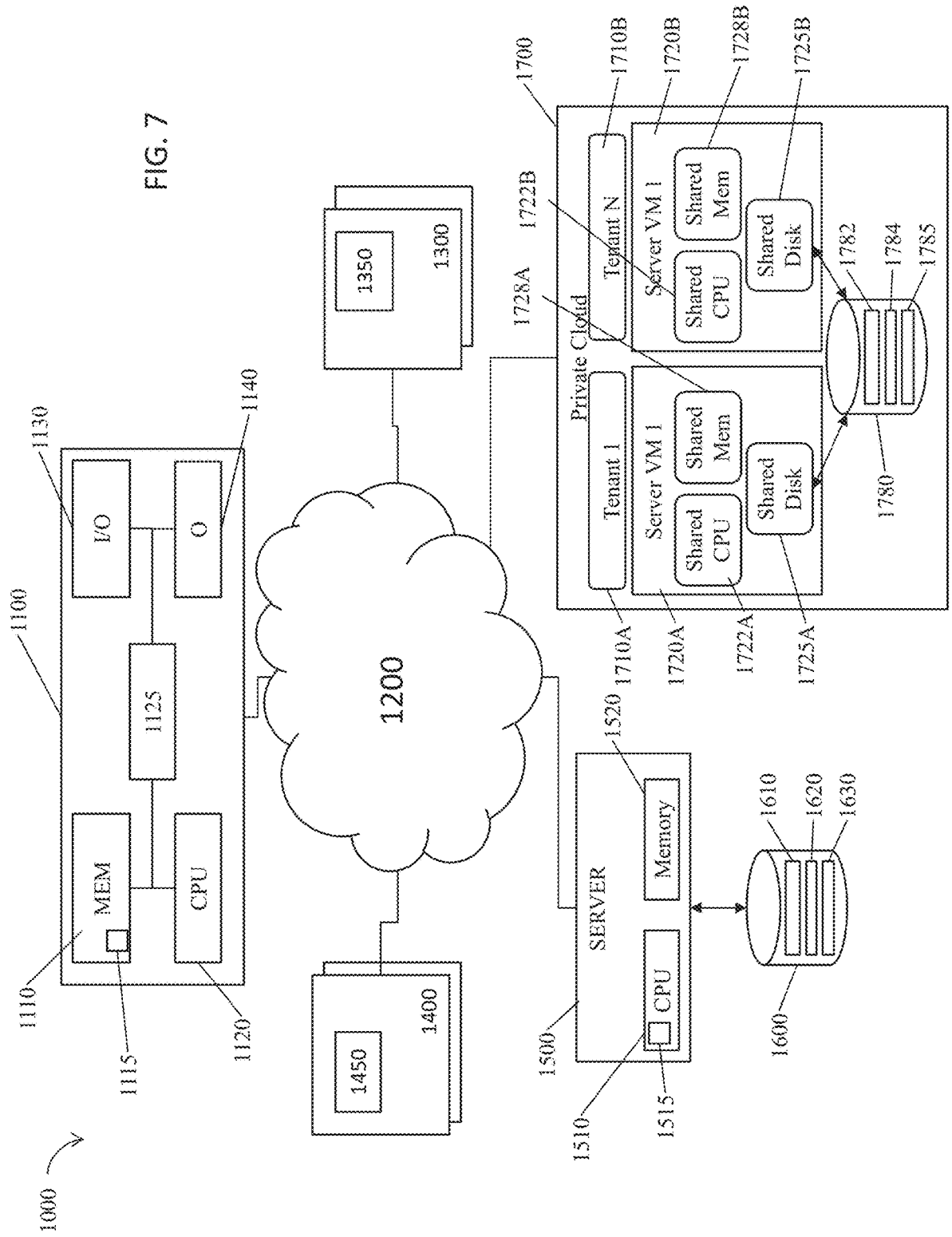
FIG. 7 is a schematic diagram illustrating a computer system for the present invention.

As illustrated in FIG. 7, the system 1000 is comprised of both dedicated servers 1500 and servers operating within a private cloud 1700. The dedicated servers 1500 contain: processing units 1510, memory 1520 data storage 1600. Dedicated servers 1500 are constructed, configured and coupled to enable communication over a network 1200. Servers 1720 operating within a private cloud 1700 leverage shared processing units 1722A, shared memory 1725A and shared disk 1728A are also configured and coupled to enable communications over a network 1200. The dedicated servers 1500 and cloud servers 1700 provide for user interconnection over the network 1200 using computers 1110 positioned remotely from the servers. Furthermore, the system is operable for a multiplicity of remote computers or terminals 1300, 1400 to access the dedicated servers 1500 and servers 1720A operating within a private cloud 1700 remotely. For example, in a request and reply architecture devices registered to marketplace participants may interconnect through the network 1200 to access data within dedicated servers 1600 and within the private cloud 1780. In preferred embodiments, the network 1200 is the Internet, or it could be an intranet, or any other network suitable for searching, obtaining, and/or using information and/or communications, including receiving the notification and providing a response.

The system of the present invention further includes an operating system 1515 installed and running on the dedicated servers 1500, enabling servers 1500 to communicate through network 1200 with the remote, registered devices. The operating system may be any operating system 1515 known in the art that is suitable for network communication. A memory within dedicated servers 1520 is interconnected with the server 1500. Memory 1520 may be integral with server 1500 or may be external to the server and interconnected therewith. A program of instruction 1620 is resident in memory 1520 within the parameters set by the operating system 1515 which accesses persistent storage 1600.

The system of the present invention further includes servers 1720A which support multiple tenants 1710A within a private cloud 1700 that share system resources through multiple virtual machines 1720A. Each virtual machine 1720A consists of an operating system installed and running on shared processing units 1722A, shared memory 1725A, shared persistent storage 1728A which access programmatic and user data 1782. The private cloud 1700 communicates through the network 1200 with remote registered devices. The operating system and virtual machines 1720A may be any such kind known in the art that is suitable for managing multi-tenant cloud services and network communication. Memory 1725A within shared cloud infrastructure is interconnected with each associated virtual machine 1720A according to the operating system running within the processing unity 1722A. A program of instruction 1782 is managed within memory 1725A upon retrieval by disk management 1728A within the parameters set by the operating system 1720 and virtual machine. Additionally, the following components are illustrated in FIG. 5: device 1100, instructions 1115, processor 1120, input/output interface 1130, bus 1125, memory 1350, 1450, instructions 1610, 1785 applications 1630, 1784, tenant N 1710B, server VM N 1720B, shared memory 1722B, shared disk 1728B and shared CPU 1725B.

Figure 8:
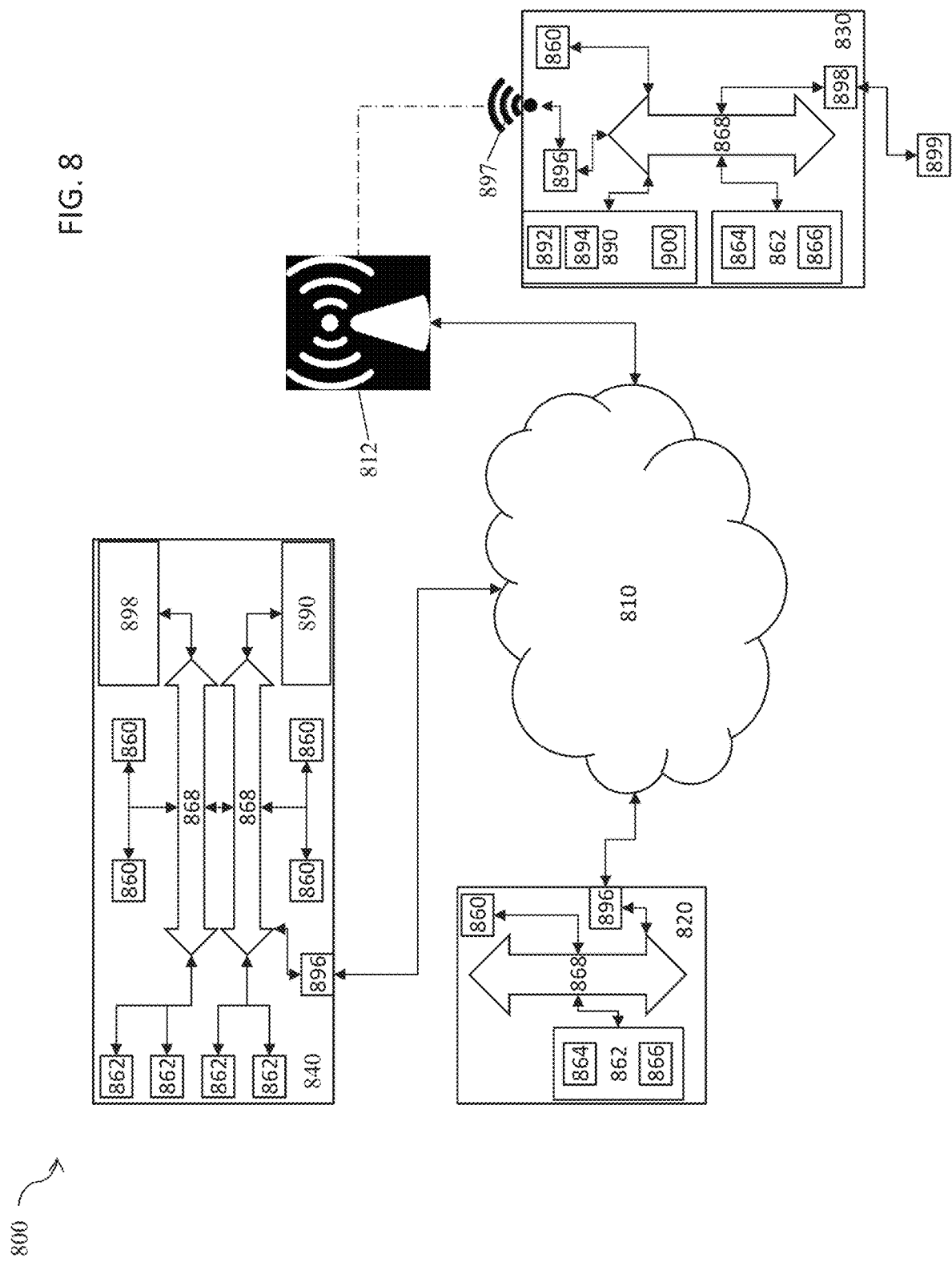
FIG. 8 is another schematic diagram illustrating a computer system for the present invention.

Additionally or alternatively to FIG. 7, FIG. 8 is a schematic diagram of an embodiment of the invention illustrating a computer system, generally described as 800, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital devices 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 8 a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage device 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 8 may include other components that are not explicitly shown in FIG. 8 or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Referring now to the use of signals for evaluating the effectiveness of a stimulus, determining a value of the stimulus, and optimization of stimulus presentation, third-party observers determine or measure behaviors of a single object or a group of objects after exposure to a stimulus and provide measurement signals within the federated data marketplace platform. Observers or observer computers selling measurement signals in the federated data marketplace are referred to as measurement signal providers. Importantly, each signal provider, signal seller, signal provider computer, and/or signal seller computer of the present invention is preferably operable to provide different types of signals including behavior signals, measurement signals, and lift signals. Advantageously, a signal requestor or signal requestor computer can request a signal which represents whether a stimulus was exposed to an audience and the effect of the stimulus on the audience. The signal request is sent to a specific signal provider computer or type of signal provider computer that represents stimulus exposure parties such as a network, a channel, a publication, a billboard, a website, etc.

Behavior, state, location, and other aggregate data of an exposed group is compared to similar data for a control group to provide the signal. Preferably the aggregate data of the exposed group and the aggregate data of the control group are from the same time period. Other factors such as location, age, gender, region, zip code, devices owned, devices operable to receive stimuli, exposure to conditions such as weather, income level, familial status, height, weight, and/or any other attribute are used to select the control group. The aggregate data for the exposed group and the aggregate data for the control group are preferably compared for the same time period. Advantageously, this provides for the exposed group and the control group to experience the same seasonal and macroeconomic effects. Accordingly, these effects do not affect a difference between the aggregate data for the exposed group and the aggregate data for the control group.

In one embodiment, objects are aggregated for assessment of the impact and/or effectiveness of a stimulus or actors delivering the stimulus within a federated data marketplace platform. In a marketing embodiment, the stimulus is an advertisement and the actors include publishers, data providers, creative agencies, etc. An aggregate measurement of the behaviors of a set of objects protects the anonymity of single object behaviors. In another embodiment, the behaviors of a set of objects are measured to determine behavioral trends within the federated data marketplace platform. For example, fast food purchase by consumers in a certain geographical region is tracked and measured over time and gym membership purchase is monitored and measured as well. Measurement signals for fast food purchase and gym membership purchase are created and compared to show if the consumer behavior shifts to be healthier or not. Additionally, cohorting or grouping aggregate groups within the federated data marketplace provides for determining the impact of different stimuli. "Cohorting" includes grouping objects according to age, gender, region, zip code, devices owned, devices operable to receive stimuli, exposure to conditions such as weather, exposure vs. nonexposure to the stimulus, time(s) and/or day(s) exposed to the stimulus, a number of exposures to the stimulus, type of stimulus exposure (creative, traditional, audio, video, visual, text, etc.), exposure to other stimuli, income level, familial status, height, weight, market share, and/or any other attribute. An entire population of objects is classified or cohorted based on at least one of these attributes. Cohorts are often mutually exclusive, but objects also overlap between cohorts depending on how the cohorts are defined. Responses to stimuli are analyzed based on the cohorts or groupings. If there is not a difference beyond a threshold in response to a stimulus between cohorts, the responses are combined in one embodiment. Alternatively, the responses are maintained in separate cohorts. The threshold is standard deviation in one embodiment.

In one embodiment, the stimulus is an advertisement of a product or service targeting an object or a set of objects. Measurement signals specify how an object event, an object state, an object behavior, and/or an object relationship to other objects have changed across a time period. The time period is preferably determined by potential buyers of the measurement signals based on the type of advertisement, a time period during which a stimulus such as an advertisement has been utilized and other factors including attributes of the objects such as age, gender, region, zip code, income level, familial status, height, weight, etc. In one embodiment, the measurement signals include data such as a purchase event, a purchase amount, items purchased, merchant name, location, time, quantity of items, name of items, weight of items, event, objects nearby, and behaviors before and after event.

In one embodiment, a signal buyer computer sends a request for aggregate purchase data for a certain product or service during a specific time period after an advertisement is sent to a multiplicity of objects. The request for aggregate purchase data includes a request for aggregate measurement or aggregate behavior of the multiplicity of objects. The multiplicity of objects is identified using a multiplicity of anonymized object identifiers in the federated data marketplace platform such that the identities of the objects are not disclosed during the transaction. Preferably, the multiplicity of anonymized object identifiers are key pairs as described in U.S. application Ser. No. 15/477,743, filed Apr. 3, 2017, which is incorporated by reference herein in its entirety. A key pair refers to virtual or electronic data structured in a pair format, with one member of the pair being an anonymized object identifier that is operable to facilitate anonymized and secure exchange of data based on one or more predefined uses agreed upon by parties to a transaction. The term "anonymized object identifier" refers to an anonymized identifier which is held, used, and/or owned by an entity in a data exchange or data marketplace. The anonymized object identifier is an electronic data construct which represents an underlying, internally held object identifier stored in an electronic database on a party computer. Notably, the anonymized object identifier does not disclose any information about the internally held object identifier or any underlying information associated with the internally held object identifier or the object. Rather, the anonymized object identifier is an electronic data construct, similar to electronically encrypted data, which allows for parties to exchange signals and reports which are constructed based on underlying data without disclosing any internally held object identifiers or raw data underlying the signals and/or reports. Thus, like electronic encrypted data, the anonymized object identifiers of the present invention are inextricably tied to computer technology.

In one embodiment, the federated data marketplace platform sends the request to one or more signal provider computers. The one or more signal provider computers also receive an identity of the signal buyer and a permission for a specific use of the anonymized object identifiers through the federated data marketplace platform. The one or more signal provider computers create one or more signals based on the request and raw data sources related to purchase activities by the multiplicity of objects. The one or more signal provider computers send the one or more signals to the federated data marketplace platform for distribution. The federated data marketplace platform evaluates the quality of the one or more signals and sets a quality value for each signal provided by each signal provider. The signal buyer selects the signals based on the type of advertisement, absolute or relative signal quality, cost, and other relevant factors. In another embodiment, the signal buyer request specifies a location requirement, competitor information, and other information including attributes of objects such as age, gender, region, zip code, income level, familial status, height, weight, etc.

Trackable behavior which is conveyed through one or more signals in the present invention include presence at a physical location. Preferably, presence is determined through object or consumer electronic devices and technology operable to determine location data as described herein. Presence also includes virtual presence, namely the presence of devices or objects without the physical presence of a consumer, such as presence enabled by technologies such as telepresence, virtual reality, and holography. One example of virtual presence includes a consumer calling into a physical store via an electronic device (e.g., camera, telerobot, etc.) to communicate with store workers, browse physical products within the physical store, and try or test certain physical products remotely. Data related to a physical or virtual presence at a physical location includes a duration of presence, a recency of presence, a frequency of presence, and/or a time between visits to the physical location. Trackable behavior also includes visits to an online or digital destination, such as an app, a program, or a website. Like presence at a physical location, data related to a visit to an online or digital destination includes a duration of presence, a recency of presence, a frequency of presence, and/or a time between visits to the online or digital destination. Trackable behavior also includes presence of items in physical or virtual shopping carts and duration of items in physical or virtual shopping carts.

Preferably, the one or more signals do not include any indication of the basis of the request. The one or more signals preferably include aggregate purchase data and analytics based on the aggregate purchase data, the aggregate purchase data including a total spend amount, a count of transactions for the total spend amount, a matched object identifier count, and a standard deviation in one embodiment.

The matched object identifier count includes an indication of the recognized anonymized object identifiers by the signal provider computer. By way of example, a payment processor computer acting as a signal provider computer receives 2,000,000 anonymized object identifiers. The signal provider computer matches 1,500,000 of those anonymized object identifiers to internally held object identifiers. The 1,500,000 objects represented by the identifiers are considered the sample size for the signal generated from data associated with those objects. Of the 1,500,000 anonymized object identifiers, the signal provider computer determines that 15,000 objects corresponding to the anonymized object identifiers transacted $150,000 with a median spend of $9.85. This information is preferably included in the signal from the signal provider computer. The anonymized object identifiers advantageously prevent any party other than the signal buyer from deriving any meaningful information from the signals. Importantly, neither the object identifiers internally held by the signal provider computers nor the object identifiers internally held by the requestor computer are sent to the federated data marketplace platform to preserve the privacy and anonymity of the objects.

In one embodiment of the present invention, behavior signals are provided to a data buyer looking to assess performance of a stimulus (e.g., an ad campaign). An exemplary format of a behavior signal is Aggregate_Spend_For_Group_At_Merchant. The behavior is preferably measured by an aggregate purchase or aggregate spend, including an aggregate purchase amount or an aggregate spend amount. The aggregate purchase or aggregate spend is measured in a variety of ways, including an average or median spend amount or an average or median portion of an overall wallet or an industry or spend type specific wallet, such as a fast food industry wallet, a restaurant industry wallet, an overall food wallet, etc. As used herein, wallet preferably refers to an average or median spend amount or budget. The wallet is defined as a yearly wallet, a seasonal wallet (such as fall, winter, spring, or summer), a monthly wallet, a weekly wallet, and/or a daily wallet. Advantageously, the present invention also provides for measuring aggregate behavior during a specific time period and/or during specific times of the day during a specific time period, such as between 6 am-10 am, between 11 am-1 pm, and between 5 pm-8 pm. Such times correlate to probable spend times for particular products in one embodiment. In the above example, between 11 am-1 pm correlates to a probable spend time for lunch, and thus a probable spend time for a particular meal in one embodiment of the present invention. Behavior is also measurable within a context, such as spend, purchase, location-based behavior, or any other trackable behavior relating to one merchant compared to one or more other merchants in the same or a similar industry. Notably, purchase behavior is categorized based on the method of purchase in one embodiment of the present invention, including purchases through a mobile application, in store purchases, card present purchases, card not present purchases, purchases using digital currency such as Bitcoin or Ethereum, purchases through mobile payment technology such as APPLE PAY and GOOGLE WALLET, etc.

Figure 9:
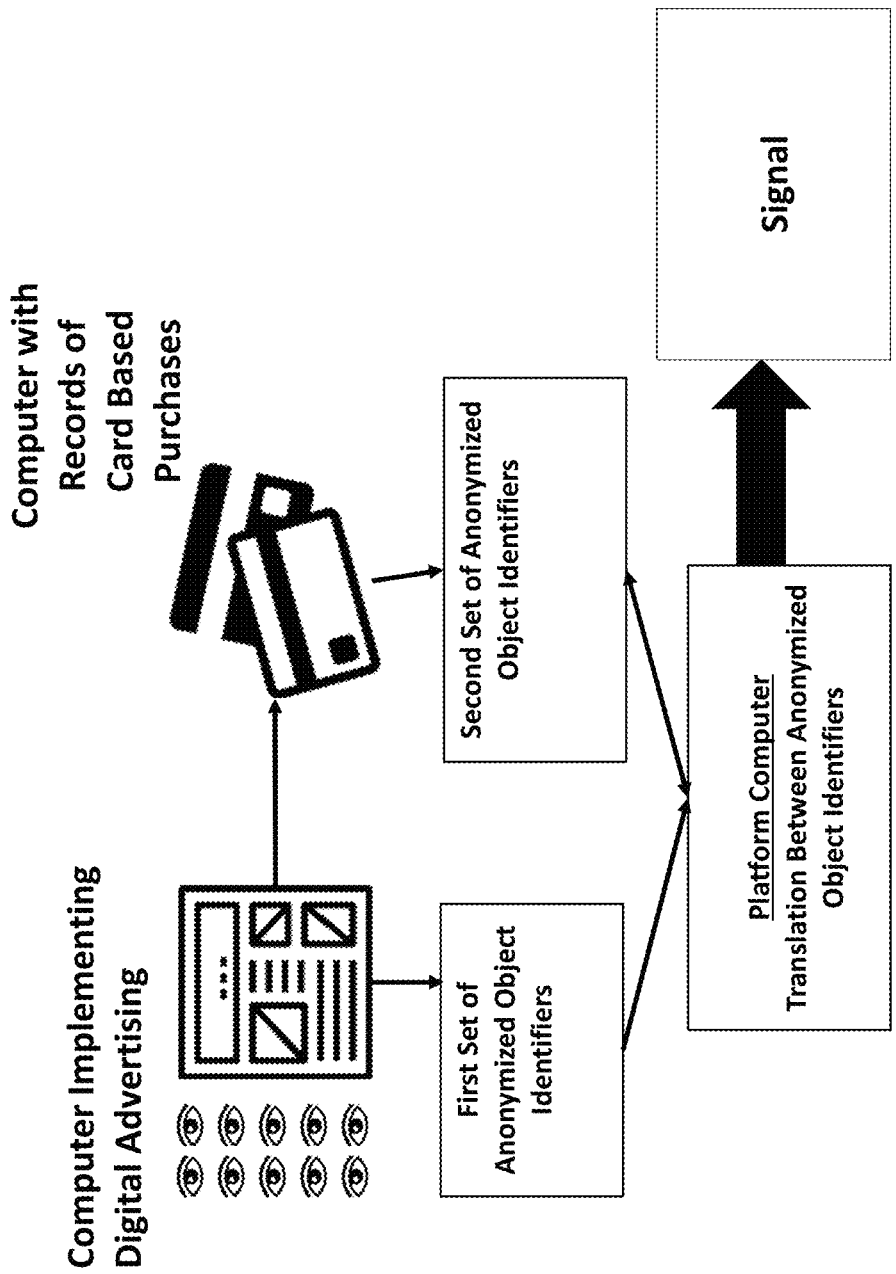
FIG. 9 is a flow diagram of the computers involved in responding to a signal request and the identifiers used to communicate about objects relating to the signal in one embodiment of the present invention.

FIG. 9 is a flow diagram of the computers involved in responding to a signal request and the identifiers used to communicate about objects relating to the signal in one embodiment of the present invention. A computer implements digital advertising by exposing a group of objects to one or more digital advertisements in an advertising campaign. The computer tracks exposure of the group of objects exposed to the one or more digital advertisements using a set of internally held object identifiers, such as account numbers, email addresses, user names, or any other identifying information. Additionally, the computer preferably tracks a list of control objects which were not exposed to the one or more digital advertisements using a list of internally held control object identifiers. In one embodiment, this list is maintained in a database of the computer. The control objects are preferably selected based on similarities to the exposed objects including age, gender, region, zip code, devices owned, devices operable to receive stimuli, exposure to conditions such as weather, income level, familial status, height, weight, and/or any other attribute.

The internally held exposed object identifiers are translated to a first set of anonymized object identifiers and sent to the platform computer for use in a signal request. Additionally, internally held control object identifiers are translated to a first set of anonymized control object identifiers and are also sent to the platform computer for use in the signal request. The platform computer translates the first set of anonymized exposed object identifiers to a second set of anonymized exposed object identifiers and the first set of anonymized control object identifiers to a second set of anonymized control object identifiers and sends the second set of exposed anonymized object identifiers to a computer with records of card based purchases. The computer with records of card based purchases translates the second set of anonymized exposed object identifiers to internally held exposed object identifiers and the second set of anonymized control object identifiers to internally held control object identifiers. Upon translating the identifiers, the computer with records of card based purchases determines aggregate data for use in construction in a signal, constructs the signal, and sends the signal to the platform. The platform sends the signal to the signal requestor.

FIG. 10 is a screen shot of a summary view of a measurement signal constructed in response to a signal request. The measurement signal includes time periods relevant to the measurement signal data including a pre-period representing a time period before the exposure period, a media period representing the exposure period, and a post-period representing a time period after the exposure period. A channel selection menu provides selection among all channels, CP (Card Present) only, and CNP (Card Not Present) only. Selection of the CP channel filters the data to only represent transactions for which the card was present. Similarly, selection of the CNP channel filters the data to only represent transactions for which the card was not present. Alternatively, the channels include an "In-Store Only" channel including purchases made in store via a dipping, swiping, or tapping a payment card or mobile payment application, an "Online Only" channel including purchases made over a network via a website, mobile app, etc., and an "All Channels" channel. Notably, the channels are operable to be defined in a variety of ways, including by payment type (online, currency type such as Bitcoin, US dollars, Euros, etc.), payment dates, payment thresholds, purchase frequency, product category, locations (regions, states, countries, etc.), and any other category as defined by a signal requestor. A confidence level drop-down menu provides selection of a confidence level for the data. Export options for the signal data include exporting to .CSV and .JSON file types. Exporting to any other file type known to one of ordinary skill in the art are also included in the scope of this invention. An audience selection feature provides for selection of audience, including selection of one or more audience cohorts in one embodiment. Sales data including incremental sales, sales lift, a buy-through rate, total sales, a change in average purchases, a change in frequency of purchases, a change in purchasers, and a change in money spent per purchaser are provided by the measurement signal in FIG. 10. Incremental sales calculated out to the entire exposed audience are also provided. The measurement signal also provides match rate data for the exposed group and the control group. Match rate data includes a number of advertiser identifiers, a number and percentage of matched cards from the total number of advertiser identifiers, and a number and percentage of actual purchasers during the media period.

Figure 11:
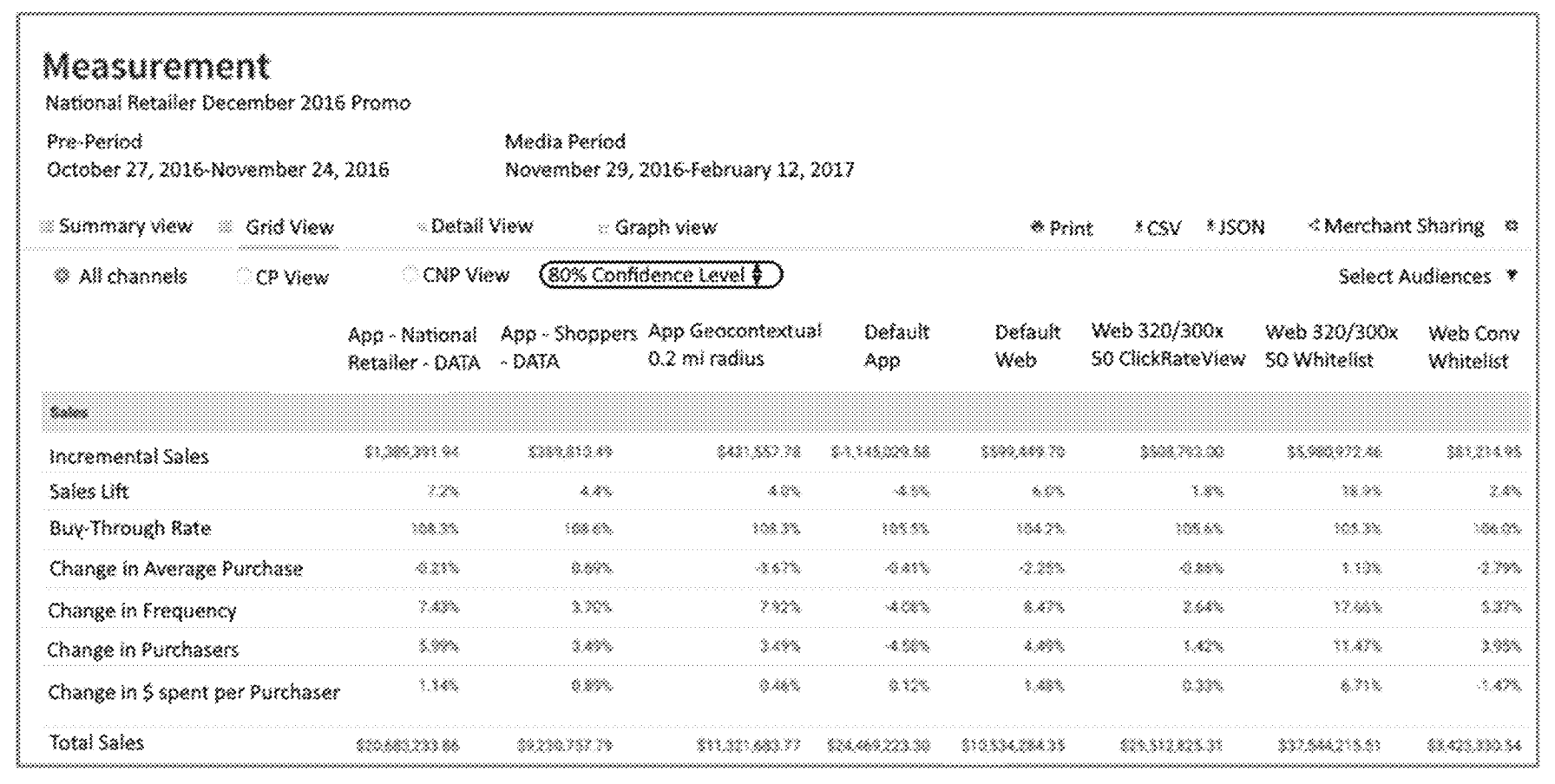

FIG. 11 is a screen shot of a grid view of a measurement signal constructed in response to a signal request. The measurement signal includes time periods relevant to the measurement signal data including a pre-period representing a time period before the exposure period and a media period representing the exposure period. A channel selection menu provides selection among all channels, CP only, and CNP only. A confidence level drop-down menu provides selection of a confidence level for the data. Sales data including incremental sales, sales lift, a buy-through rate, total sales, a change in average purchases, a change in frequency of purchases, a change in purchasers, and a change in money spent per purchaser are provided by the measurement signal. Each sales data includes categories for specific types of data. These categories are preferably based on cohorting or grouping of audiences. These categories are advantageously customizable by a signal requestor. In FIG. 11, the "App" categories refer to a cohort exposed to advertisements via a mobile app while the "Web" categories refer to a cohort exposed to advertisements via a web browser. The "Data" categories refer to cohorts which match a signal requestor's targeted demographic. Similarly, the "Shoppers" category refers to a common quantifiable behavior exhibited by the members of the cohort, such as meeting a spend frequency with the merchant or being exposed to an advertisement in the merchant's physical store. The category "Geo Contextual 0.2 radius" refers to a cohort exposed to the advertisement within 0.2 miles of a physical location of a merchant. A cohort including users who clicked on the advertisement or digitally engaged with the advertisement in any other way and performed a desired action such as putting an object in an online shopping cart, signing up for an email list, signing up for push notifications to a mobile device, or making a purchase is defined by the "Web Cony" category. "Whitelist" categories are defined by cohorts exposed to an advertisement on one or more whitelisted websites which have granted permission to expose customers to an advertisement.

Figure 12:
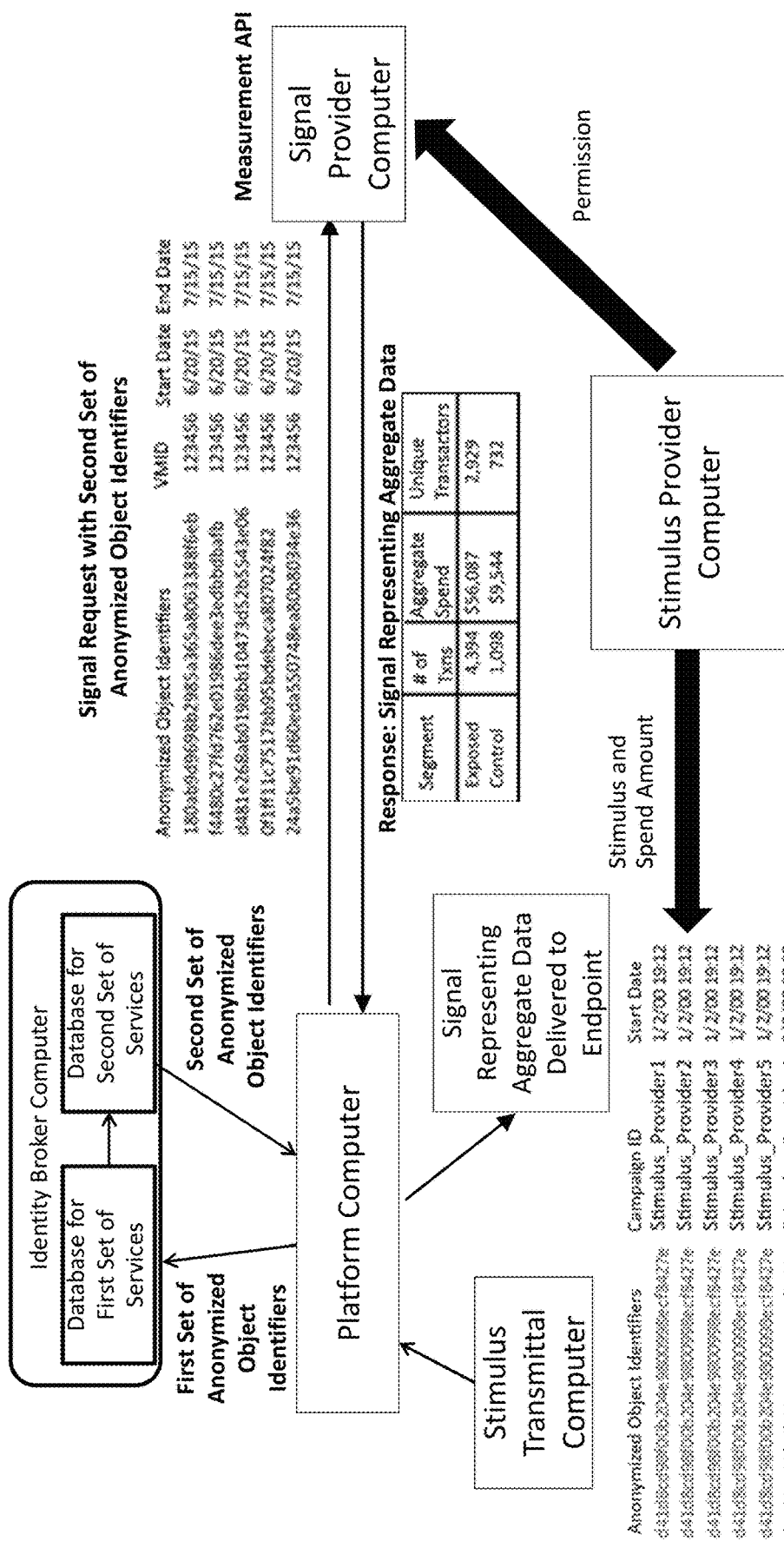
FIG. 12 is an overview of the flow of object identifiers among computers for a signal request and signal response.

FIG. 12 is an overview of the flow of object identifiers among computers for a signal request and signal response. Importantly, the platform computer holds agreements with the signal provider computer, the stimulus provider computer, the stimulus transmittal computer, and the identity broker computer. A stimulus provider computer provides a stimulus associated with an advertising campaign and a spend amount for exposure of the stimulus to an audience. The stimulus transmittal computer transmits the stimulus to audience devices and records the identities of the audience devices exposed to the stimulus as well as the exposure dates and times of the stimulus to the audience devices, as well as the start date and start time of the stimulus exposure. The stimulus provider computer requests a signal representing aggregate data from a signal provider computer through a stimulus transmittal computer, which sends the signal request to a platform computer. The stimulus provider computer also provides permission to the stimulus transmittal computer to send the signal request and for the signal provider computer to provide the signal. The signal request sent from the stimulus transmittal computer to the platform computer includes a first set of anonymized object identifiers, a request for aggregate data, and a time frame. The first set of anonymized object identifiers are translated from a set of internally held object identifiers held by the stimulus transmittal computer. The time frame is based on the start date of the stimulus exposure. The platform computer requests a translation of the first set of anonymized object identifiers to a second set of anonymized object identifiers from an identity broker computer. The identity broker computer uses a database for a first set of services and a database for a second set of services to translate between the first set of anonymized object identifiers and the second set of object identifiers. In one embodiment, the first set of services are marketing services and the second set of services are consumer information services. Alternatively, the platform computer holds the first set of anonymized object identifiers and the second set of anonymized object identifiers in a database or table and is operable to translate between these object identifiers. The platform computer sends the signal request and the second set of anonymized object identifiers to a signal provider computer. The signal provider computer includes a measurement application programming interface (API) for determining aggregate measurements relating to the objects represented by the second set of anonymized object identifiers. The signal provider computer provides a signal representing aggregate data based on the second set of anonymized object identifiers. The signal is sent to the platform computer, which then sends the signal to the stimulus transmittal computer and/or to the stimulus provider computer.

Figure 13:
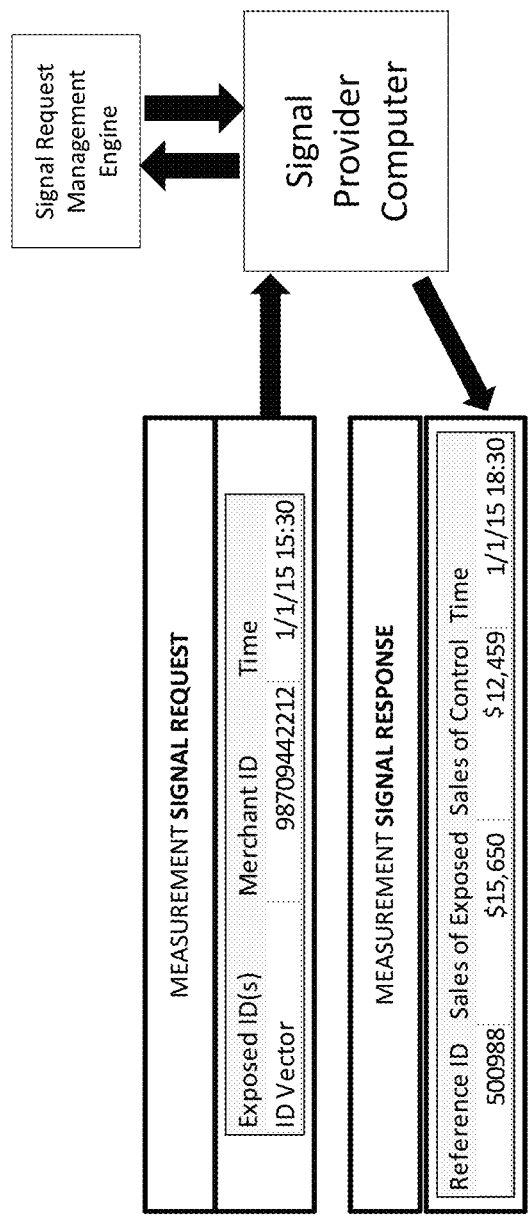
FIG. 13 illustrates a measurement signal request sent to a signal provider computer and a measurement signal response received from the signal provider computer.

FIG. 13 illustrates a measurement signal request sent to a signal provider computer and a measurement signal response sent from the signal provider computer. The measurement signal request includes an identifier vector including a set of anonymized object identifiers, a merchant identifier, and a time the signal request is sent. The set of anonymized object identifiers correspond to objects that have been exposed to a stimulus during a predetermined time period. In one embodiment, the merchant identifier is anonymized. Upon receiving the measurement signal request, the signal provider computer runs the measurement signal request through a signal request management engine. The signal request management engine is preferably stored on the signal provider computer or on a computer in secure network communication with the signal provider computer. The signal request management engine analyzes the identifier vector including the set of anonymized object identifiers according to a plurality of rules including opt out lists for objects, regulatory constraints, merchant constraints, and policies of the signal provider. The signal request management engine modifies the identifier vector by removing any anonymized object identifiers which meet criteria for exclusion based on the plurality of rules. Upon the signal provider computer obtaining the modified identifier vector from the signal request management engine, the signal provider computer translates the set of anonymized object identifiers into a set of internally held object identifiers. The signal provider computer retrieves purchase data for the internally held object identifiers and determines an aggregate spend amount for the internally held object identifiers. The signal provider computer also retrieves aggregate purchase data for a control set of internally held object identifiers. Preferably, the control set of internally held object identifiers is run through the signal request management engine before purchase data is retrieved. The control set of internally held object identifiers represent objects that have not been exposed to the stimulus, and are selected based on a variety of factors, including similarities to the internally held object identifiers such as age, gender, region, zip code, devices owned, devices operable to receive stimuli, exposure to conditions such as weather, income level, familial status, height, weight, and/or any other attribute. Upon determining the aggregate purchase data for the exposed objects represented by internally held object identifiers and the control set of internally held object identifiers, the signal provider computer sends a measurement signal response to a platform computer or to the signal requestor computer. The measurement signal response includes a reference identifier, aggregate sales of the objects exposed to the stimulus, aggregate sales of the control objects that have not been exposed to the stimulus, and a date and time that the measurement signal response is being sent from the signal provider computer.

Another example of the steps leading to construction of the behavior signal are described as follows. One million consumers are identified to have heard an audio advertisement for McDonald's new chicken sandwich on digital radio stations (e.g., Pandora, Spotify, etc.). A signal buyer or signal requestor computer of McDonald's, which in this example is run by the advertisement campaign department at McDonald's, sends a request to the federated data marketplace platform of the present invention for behavior signals as to the performance of the audio advertisement. The behavior of the one million consumers can be measured by an aggregate spend based on payment data and/or location data of the one million consumers. In this example, the digital radio station maintains a database or other record of which accounts the digital radio station exposed to the audio advertisement. The digital radio station identifies these accounts with a set of internally held virtual object identifiers, such as email addresses. This set of internally held virtual object identifiers is correlated or mapped to a first set of anonymized virtual object identifiers. A payment network (e.g., Visa) or other data provider holds raw data which is operable to provide quantitative feedback on the audio advertisement. In this example, a payment network holds spend activity data at McDonald's during the relevant time period for the audio advertisement. The payment network identifies the McDonald's consumers with a set of internally held virtual object identifiers, such as card or account numbers. This set of internally held virtual object identifiers is correlated or mapped to a second set of anonymized virtual object identifiers within the payment network. Importantly, the payment network never receives the correlation or mapping between the first set of anonymized virtual object identifiers and the set of internally held virtual object identifiers held by the digital radio station. Likewise, the digital radio station never receives the mapping between the second set of anonymized virtual object identifiers and the set of internally held virtual object identifiers held by the payment network. In response to a request from the platform of the present invention for an aggregate spend from consumers exposed to an audio ad, the digital radio station sends the platform a list of consumers, represented by a first set of anonymized virtual object identifiers. The platform translates the first set of anonymized virtual object identifiers to the second set of anonymized virtual object identifiers, and sends this second set of anonymized virtual object identifiers to the payment network. The payment network translates the second set of anonymized virtual object identifiers into a corresponding set of internally held virtual object identifiers held by the payment network to determine the aggregate spend of those consumers. The payment network sends this aggregate spend information to the platform, which sends the aggregate spend information to McDonald's. In one embodiment, the payment network or another party owns, holds, or stores data on specific items for an aggregate spend, such a new chicken sandwich at McDonald's. In another embodiment, a holder of location data such as a cell phone service provider, a wireless network access provider such as a WIFI provider, or any other entity with location based data which determines location data based on specialized hardware and software, including but not limited to Global Positioning System (GPS), wireless network cards, radiofrequency (RF) receivers, beacons, etc., is operable to provide an aggregate list of consumers, identified by anonymized virtual object identifiers, to the platform. This aggregate list includes consumers present at a McDonald's during the relevant time period in relation to the audio advertisement.

In another embodiment of the present invention, a signal requestor computer requests a signal relating to the aggregate exposure of an identified group of objects or consumers to an advertisement. The signal requestor computer transmits a first set of anonymized object identifiers to the server platform computer with a request for one or more signals relating to exposure data for the first set of anonymized object identifiers. The first set of anonymized object identifiers is created by the signal requestor computer from a first set of internally held object identifiers. Each of the first set of internally held object identifiers is related to a behavior, such as purchase behavior including a purchase or spend level, a purchase or spend frequency, or a purchase or spend recency, and/or a location behavior, such as a presence, a presence frequency, or a presence recency. The server platform computer translates the first set of anonymized object identifiers to at least a second set of anonymized object identifiers. Other translations to a third set of anonymized object identifiers, a fourth set of anonymized object identifiers, etc. are performed for each signal provider computer the server platform requests a signal from so that no two signal provider computers receive the same set of anonymized object identifiers. Upon transmitting a set of anonymized object identifiers to a signal provider computer, the signal provider computer translates the set of anonymized object identifiers to a set of internally held object identifiers. The signal provider computer constructs at least one signal from raw data associated with the set of internally held object identifiers. The at least one signal provides an aggregate measure of exposure data to a stimulus for the identified group of objects. In one example, McDonald's is a signal requestor computer and requests a signal relating to exposure data for a group of consumers who have spent more than $50 at McDonald's in the past year. McDonald's holds spend data for the group of consumers in a transaction database, wherein the consumers and purchase amounts are identified by a payment account, a loyalty card, etc. During the past year, McDonald's has paid Pandora to play a McDonald's advertisement. Pandora responds with an aggregate measurement of exposure to the advertisement for the identified consumers. Preferably, the aggregate measurement is a percentage of the identified consumers exposed to the advertisement. Alternatively, the aggregate measurement is an average or median exposure rate for the group consumers of consumers out of the identified consumers who were actually exposed to the advertisement.

As one of ordinary skill in the art will appreciate, a digital radio ad is just one example of a stimulus according to the present invention. An electronic graphical stimulus is also displayed or presented on or through a web page, a mobile application, a GUI of a device, or a computer program in another embodiment of the present invention. Other examples of stimuli include online or digital video advertisements, such as advertisements on user-uploaded sites like YOUTUBE, and advertisements on TV and movie provider sites, such as HULU. Both digital radio websites and digital video websites preferably track a group of consumers who has been exposed to the stimulus via a database which correlates internally used object identifiers to dates and times of exposure and number of exposures. Additionally, a context of exposure is stored in the database. A context of exposure includes the context in which the stimulus was presented. For example, the context of exposure for a digital radio advertisement is based on the genre of music or genre of talk show preceding or following the digital radio advertisement. The relative effectiveness of stimuli is correlated to genres of music, such as jazz, hard rock, soul, classical, or blues in one embodiment. Similarly, the relative effectiveness of stimuli is correlated to genres of TV shows or movies, such as thriller, horror, adventure, documentary, and comedy in another embodiment of the present invention. The content type, such as TV show, movie, movie trailer, documentary, news, comedy standup special, etc. also has an impact on the relative effectiveness of stimuli in another embodiment of the present invention, and is correlated in a database owned by the content provider.

In another embodiment of the present invention, the database of the content provider includes information relating to advertisement preferences. Some content providers currently provide for customization of advertisements based on user input and/or a user profile. To illustrate, a digital video platform shows an advertisement before showing the feature content, and provides a dialog box including a radio button or check box input for viewer feedback on a level of interest for the advertisement. The digital video platform preferably stores these preferences in a database and correlates these preferences to an internally held object identifier, such as a user ID, an email address, an account number, etc.

In another embodiment, the signal seller or data provider is a website or an online advertising service. The present invention is operable to function with all web sites and other technological methods of displaying information which are operable to include stimuli such as advertisements, including programs, mobile apps, etc. Examples of such websites include news websites, online shopping websites, social media websites, etc.

Signal sellers or data providers are providers of location data in another embodiment of the present invention. Location is determined in the present invention using one or more hardware and/or software components interacting with a user device. A user device preferably includes a processor, a display, and hardware and software operable to connect the user device to a network. The user device is a mobile communications device in one embodiment of the present invention. Alternatively, the mobile communications device is any other device operable to produce electronic data and communicate the data to other devices through wired or wireless connections, including a wearable device, a car, a security system, a television, a radio, a watch, smart clothing, a laptop computer, and/or a desktop computer.

Location data is determined using Global Positioning System (GPS), low energy Bluetooth based systems such as beacons, wireless network based positioning systems such as WIFI, Radio Frequency (RF) systems including RF Identification (RFID), Near Field Communication (NFC) systems, magnetic positioning, cellular triangulation, and/or any other method known for determining location. Signal sellers or data providers include computers which track location data, such as mobile applications, wireless service providers including WIFI providers, and cellular service providers. Location data is preferably correlated to business names in a database in one embodiment of the present invention. An Internet Protocol (IP) address is preferably correlated to a latitude and longitude, which is correlated to a business currently occupying the space at that latitude and longitude. In another example, one or more beacons interact with a user device in a store, such as a Durham Best Buy store. The beacons are correlated with the Durham Best Buy store in a database. In a further embodiment, each of the beacons is correlated with a specific section of the Durham Best Buy store, such as the TV section, the laptop computer section, the phone section, the music section, and the video games section such that location data provided by the beacons and/or the device communicating with the beacons includes information identifying the sections of the store at which the device was present. The location data also includes a duration of time spent at the store and/or at or within specific sections of the store in one embodiment of the present invention.

In another embodiment, location data of a device is linked to a location and time where a stimulus is displayed. Duration and/or frequency of device presence is also linked to the location data in one embodiment of the present invention. In one example, location data is derived from a device that passes a billboard including an advertisement for the new McDonald's chicken sandwich in a given week. This location data combined with location data for other devices which have also passed the billboard including the advertisement for the new McDonald's chicken sandwich in that week form aggregate exposure data to that advertisement.

Exposure data is obtained from subscription data in another embodiment of the present invention. By way of example, subscriptions to magazines, newspapers, mailing lists, email lists, etc. are held by a data provider. Correlations between the subscription and an advertisement in the relevant medium are also maintained by the data provider. These correlations provide data for exposure to a stimulus in one embodiment of the present invention. In another embodiment, purchase data relating to purchase of tickets to events such as sporting events, movies, concerts, etc., or purchase of goods or services at these events, is held by a data provider. This purchase data indicates presence at an event, and is correlated to exposure to stimuli such as advertisements in one embodiment of the present invention.

Thus, exposure to stimuli is tracked in a variety of ways according to the present invention. Significantly, an exposure to a stimulus, dates and/or times of exposure to a stimulus, a frequency of exposure to a stimulus, a recency of exposure to a stimulus, a preference for a stimulus, and/or combinations thereof is stored by one or more data provider computers or signal seller computers in the present invention. This data is stored as raw structured data in databases or account records of the computers, or as raw unstructured data.

In one embodiment of the present invention, measurement signals convey information about observations made by an observer, preferably through an observer computer, which assess a change in behavior across one or more objects over a time period. In one embodiment, a measurement signal is equal to Aggregate_Spend_For_Group_At_Merchant during a time period BEFORE the stimulus LESS Aggregate_Spend_For_Group_At_Merchant during a time period AFTER the stimulus. In another embodiment, a measurement signal is equal to Aggregate_Spend_For_Group_At_Merchant during a time period AFTER the stimulus LESS Aggregate_Spend_For_Group_At_Merchant during a time period BEFORE the stimulus. For example, one million consumers are exposed to an audio advertisement for McDonald's new chicken sandwich on Pandora on Jun. 1, 2017, the measurement signal for listener behavior and the impact of the McDonald's audio advertisement stimulus is determined as the spend of the group of consumers exposed to the advertisement on the new chicken sandwich at McDonald's during a period of two weeks before the advertisement less the spend of the group of consumers exposed to the advertisement on the new chicken sandwich at McDonald's during two weeks after the stimulus. In another embodiment, among the group of consumers exposed to the advertisement on the new chicken sandwich at McDonald's, the spend of a group of consumers who used to buy at Chick-Fil-A's before the is compared with the spend of the same group of consumers on McDonald's new chicken sandwich after the McDonald's advertisement. Thus, a measurement signal is determined to reflect a change in behavior in response to the audio advertisement of McDonald's new chicken sandwich.

In one embodiment, signals are determined to assess the effect of advertising by comparing aggregate spend on the advertised product or service to aggregate spend on all products or services at a merchant. For example, after an audio advertisement for McDonald's new chicken sandwich is aired, the number of orders for the new chicken sandwich at McDonald's is compared with the number of visits at McDonald's during a period of two weeks in a certain area. Payment activities are aggregated with location data from certain payment networks to create measurement signals by comparing an aggregated purchase of the new chicken sandwich at McDonald's to an aggregate purchase of all visits at McDonald's in the certain area.

In one embodiment, separate signals are compared within the same time period to indicate relative value as opposed to absolute value. A lift signal is defined as the measurement of behavior of a group that experienced a stimulus during a time period versus the measurement of behavior of a control group that was not exposed to the stimulus during the same time period. The control group is selected using a randomized control trial (experimental design) or an observational study. To select a control group based on a randomized control trial, a stimulus exposure computer selects targeting criteria. The stimulus exposure computer is presented with an individual who meets their targeting criteria, by way of example through a consumer visiting their website. Based on a pseudorandom number generator or a "coin flip" approach, the consumer is assigned to either a group for exposure or a control group. If the consumer is in the control group, the consumer is not exposed to the stimulus. If the consumer is in the exposure group, the consumer is exposed to the stimulus. The stimulus exposure computer records the exposure or control data of the consumer using internally held object identifiers. In an observational study, a consumer is exposed to a stimulus based on targeting criteria from the stimulus exposure computer. The consumer is then exposed to the stimulus and records an identity of the consumer using an internally held object identifier as belonging to the exposed group. Upon generating a set of internally held object identifiers represented by internally held object identifiers, the stimulus exposure computer determines a control group based on similarities to the exposed group. Similar past behaviors, including spend activity and location data, are used to select the control group. These behaviors are preferably analyzed as signals when selecting the control group. Other factors utilized when selecting the control group include similar affinities, subscriptions, etc. Preferably, the control group is selected before the stimulus exposure to the exposed group.

In one example of determining a lift signal in the present invention, one million consumers are exposed to an audio advertisement for McDonald's new chicken sandwich on Pandora on Jun. 1, 2017. In this embodiment, the lift signal is the spend on McDonald's new chicken sandwich by the group of one million consumers exposed to the audio advertisement during the two weeks after the audio advertisement (exposed group) less the spend on McDonald's new chicken sandwich by a group of one million consumers that were not exposed to the audio advertisement (control group). The lift signal is determined as a relative value of the spend on McDonald's new chicken sandwich by the group of consumers exposed to the audio advertisement, and the reference is the absolute spend on McDonald's new chicken sandwich by the group of one million consumers that were not exposed to the advertisement.

A comparative measurement signal is defined as the measurement of behavior of a group that experienced a stimulus versus the measurement of behavior of a control group that was exposed to a different stimulus during the same time period. In one example, the comparative measurement signal is determined as the spend of the group of consumers exposed to the advertisement during the two weeks after the advertisement versus the spend of a group of one million consumers that were exposed to a Chick-Fil-A advertisement during the same time period. The comparative measurement signal is determined as a relative value of the spend on McDonald's new chicken sandwich by the group of consumers exposed to the audio advertisement, and the reference is the absolute spend on McDonald's new chicken sandwich by the group of one million consumers that were exposed to a Chick-Fil-A advertisement during the same time period.

Behavior signals, measurement signals, and lift signals sourced from neutral observers of object behavior are used to optimize advertisement within the federated data marketplace platform to focus effort on less effective stimuli. In one embodiment, the federated data marketplace platform is configured to perform optimization analytics. For example, McDonald's objective is to increase sales. Audio advertisement delivered $1 million in incremental sales, and video advertisement delivered $500 k in incremental sales. Thus, optimization includes focusing effort on the stimulus provided by video advertisement as this form of advertisement is not as effective as audio advertisement. The federated data marketplace platform is operable to analyze signals for the audio advertisement, the signals comprising payment data, location data, demographic data of anonymized consumers who hear the audio advertisement as well as when and where they heard the audio advertisement. For example, the audio advertisement can be received on the way to work, at lunch time, or on the way home after work on Pandora or Spotify or other audio channels. Similarly, the federated data marketplace platform is operable to analyze payment data, location data, demographic data of anonymized consumers who watched the audio advertisement as well as when and where they watched the video advertisement. For example, the audio advertisement is streamed during worktime, or at night, or weekends on YouTube, other internet websites, or cable TV.

The objects or consumers are preferably grouped according to certain characteristics, including location, age group, gender, income, familial status, and/or work status. In one example, the consumers are working millennials in urban areas or college students around campus. In another embodiment, the consumers are working parents in urban areas or retirees in rural areas. Identification of characteristics to classify these consumers is performed via signals such that raw or personal data of consumers is not disclosed. Individual or aggregate location data is determined via one or more signals generated from location data, such as signals created through WIFI providers, cellular service providers, GPS service providers, etc. in one embodiment of the present invention. This location data is transformed into signals and a location class (e.g., urban, rural, college campus, etc.) or specific location (e.g., Charlotte, Chapel Hill, Redmond, Orange County, Chatham County, Virginia, North Carolina, Washington, the Midwest, the South, etc.) is determined based on the one or more signals. Different factors are considered in an optimization process on the federated data marketplace platform to provide improvement insights for the less effective advertisement. These original groups of objects or consumers selected for exposure to stimuli are further operable to be modified based on signals which provide aggregate behavior in response to stimuli as described herein and in the applications incorporated herein. Notably, the objects or consumers exposed to stimuli are operable to be determined based on signals previously purchased by signal buyers.

In one embodiment, separate signals within successive time periods are compared to assess signal quality. For example, an audio advertisement for McDonald's new chicken sandwich is broadcast on Pandora every Monday, and there are a certain number of consumers who hear that advertisement every Monday. A measurement signal is determined for the group of consumers who hear the audio advertisement every Monday by comparing their spend on the new chicken sandwich during the week after they hear the audio advertisement and their spend on the new chicken sandwich during the week before they hear the audio advertisement. For example, separate measurement signals of spend activity are compared for eight successive weeks. In this example, if at least six out of eight of the measurement signals have similar values, the quality of the measurement signals reflects the impact of the audio advertisement. If values of one or two measurement signals deviate from those of other measurement signals, the one or two measurement signals are not considered for impact evaluation of the audio advertisement.

In one embodiment, summary statistics are applied by the federated data marketplace platform to evaluate the quality of measurement signals. A sample mean is determined as a measure of an average of the measurement signals, a sample standard deviation is determined as a measure of statistical dispersion of the measurement signals, and a standard error is determined as a measure of the standard deviation of the sample mean or the measure of dispersion of the sample mean.

A value of a signal of the present invention is preferably based upon at least two factors including event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof. Preferably, after signals are constructed, the distribution or sale to signal buyers is controlled by the signal providers and rules on the federated data marketplace platform governing the signal providers and signal buyers for approved use of the signals.

The federated data marketplace allows signal buyers to select signals from multiple signal providers based upon the type of stimulus, the cost, the signal quality, and match rates of the objects exposed to the stimulus relative to the number of objects that can be observed by a signal provider. The actual match rate is defined as the percentage of common objects across two parties for which one party holds a first status, behavior, location, or other state data and the other party holds a second status, behavior, location, or other state data. By way of example, if a service provider which shows advertisements holds stimuli exposure information for objects W, X, Y, and Z, and a payment processor holds payment data information for objects W, X, and Y, the actual match rate is 75%. The global match rate for a particular signal provider is defined as the percentage of objects for which the party could hold data out of all the objects for which the party holds data or all of the objects of a certain cohort or group for which the party holds data. By way of example, the global match rate is determined by a number of objects or consumers that have a device and application necessary to view content a signal provider desires to send to the application—this global match rate is provided as a percentage of matches for the objects having the application and device out of the total number of objects, a group of objects, a cohort of objects, etc. In one embodiment, the match rate is expressed in relation to a signal or requested signal such that a set of objects is identified by the signal requestor along with a signal and a signal provider indicates a match rate for a signal. In one embodiment, a signal requestor computer with a list of objects requests quotes and match rates for a signal that relates to the behavior of the list of objects. One or more signal provider computers return a quote for the signal along with a match rate which indicates a percentage of objects out of the list of objects the quoted signal represents.

The present invention is inextricably tied to computer technology as it requires construction of a new type of electronic data with specific qualities as claimed and referenced above. Raw data is remained localized on a data source computer while constructed signals are transmitted over a network to a centralized server and database and to a signal buyer computer. Computer technology is therefore necessary for the claimed invention to function. Additionally, the present invention addresses challenges particular to computer technology, including preserving the value of underlying raw data while providing a signal to create value out of the raw data. This was not a challenge that existed before computer technology and is unique to computer technology. The present invention utilizes computer technology to solve this problem specific to computer technology. The signal construct also provides the benefits of privacy protection for the one or more objects associated with the signal by not disclosing the identities of the one or more objects and furthermore anonymizes the one or more objects. The signal is only disseminated over a network to a centralized sever and database and to at least one signal buyer computer for a predetermined signal usage. The present invention is necessarily rooted in computer technology in order to overcome a problem specifically arising in the realm of computer networks, namely preserving the value of raw data by requiring the raw data to remain localized on the data source computer while creating a signal construct from the raw data to allow use and value to be obtained through the signal.

The claimed invention improves the technological fields of electronic data security, as well as marketing and advertising. Specifically, consumer privacy and anonymity are protected in advertisement campaigns. The separation of the raw data from a signal that is stored in a database and identified with an advertisement campaign through the use of a rules system represents an improvement to the technical field of advertising. Additionally, the federated data marketplace platform in the present invention provides quantified feedback and/or observations of object behaviors to measure and optimize the effectiveness of the advertisement campaign.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for evaluating an effectiveness of an electronic stimulus comprising:
   a server platform device receiving a request from a signal requestor device for behavioral data, wherein the request for the behavioral data comprises a reference point for a behavior;
   the server platform device sending a request to a stimulus transmittal device for a first set of anonymized identifiers associated with a plurality of devices exposed to the electronic stimulus by the stimulus transmittal device during a time period;
      wherein each of the first set of anonymized identifiers represents an identity of one or more of the plurality of devices,
      wherein the first set of anonymized identifiers corresponds to a first set of internally held identifiers within the stimulus transmittal device, and
      wherein the first set of internally held identifiers is not transmitted by the stimulus transmittal device;
   the server platform device receiving the first set of anonymized identifiers from the stimulus transmittal device;
   the server platform device translating the first set of anonymized identifiers to a second set of anonymized identifiers;
   the server platform device sending the second set of anonymized identifiers and the reference point to a signal provider device,
      wherein the second set of anonymized identifiers corresponds to a second set of internally held identifiers within the signal provider device, and wherein the second set of internally held identifiers is not transmitted by the signal provider device,
      wherein the signal provider device constructs at least one signal relating to the behavioral data from raw data stored on the signal provider device for the second set of internally held identifiers based on the reference point and a comparison of the raw data to aggregated behavioral data for a randomly selected control group of devices exposed to at least one of the electronic stimulus or a different electronic stimulus,
      wherein the raw data remains localized on the signal provider device, and wherein the at least one signal does not include the raw data, and
      wherein the at least one signal relating to the behavioral data comprises an indication of additional behavioral data of a randomly selected group of the second set of internally held identifiers;
   the server platform device receiving the at least one signal relating to the behavioral data from the signal provider device; and
   the server platform device sending the at least one signal relating to the behavioral data to the signal requestor device.

2. The method of claim 1, wherein the request from the signal requestor device for the behavioral data comprises an identifier vector, and wherein a modification of the identifier vector based on a rule associated with the server platform device identifies the first set of anonymized identifiers.

3. The method of claim 1, wherein the behavioral data comprises at least one of an aggregate spend amount, an average spend amount, a median spend amount, a spend frequency, a spend time, a spend percentage as part of an overall wallet, or a spend percentage as part of an industry wallet or sector wallet.

4. The method of claim 1, wherein the behavioral data comprises location data, and wherein the method further comprises creating the location data via one or more beacons.

5. The method of claim 1, wherein the behavioral data comprises website browsing data.

6. The method of claim 1, wherein the signal provider device constructing the at least one signal further comprises the signal provider device determining prior behavioral data relating to the first set of internally held identifiers during a time period before transmitting the electronic stimulus to the plurality of devices, and wherein the at least one signal relates to a change between the behavioral data and the prior behavioral data.

7. The method of claim 1, wherein the randomly selected control group of devices are associated with a third set of internally held identifiers within the signal provider device.

8. A system comprising:
   a memory; and
   at least one processor coupled to the memory and configured to perform operations comprising:
      receiving a request from a signal requestor device for behavioral data, wherein the request for the behavioral data comprises a reference point for a behavior;
      sending a request to a stimulus transmittal device for a first set of anonymized identifiers associated with a plurality of devices exposed to an electronic stimulus by the stimulus transmittal device during a time period,
         wherein each of the first set of anonymized identifiers represents an identity of one or more of the plurality of devices, and
         wherein the first set of anonymized identifiers corresponds to a first set of internally held identifiers within the stimulus transmittal device;
      receiving the first set of anonymized identifiers from the stimulus transmittal device;
      translating the first set of anonymized identifiers to a second set of anonymized identifiers;
      sending the second set of anonymized identifiers and the reference point to a signal provider device,
         wherein the second set of anonymized identifiers corresponds to a second set of internally held identifiers within the signal provider device;
      receiving at least one signal relating to the behavioral data from the signal provider device,
         wherein the at least one signal relating to the behavioral data is constructed from raw data stored on the signal provider device for the second set of internally held identifiers based on the reference point and a comparison of the raw data to aggregated behavioral data for a randomly selected control group of devices exposed to at least one of the electronic stimulus or a different electronic stimulus, wherein the raw data remains localized on the signal provider device, wherein the at least one signal does not include the raw data, and wherein the at least one signal relating to the behavioral data comprises an indication of additional behavioral data of a randomly selected group of the second set of internally held identifiers; and sending the at least one signal relating to the behavioral data to the signal requestor device.

9. The system of claim 8, wherein the request from the signal requestor device for the behavioral data comprises an identifier vector, and wherein a modification of the identifier vector based on a rule associated with a server platform device identifies the first set of anonymized identifiers.

10. The system of claim 8, wherein the behavioral data comprises at least one of an aggregate spend amount, an average spend amount, a median spend amount, a spend frequency, a spend time, a spend percentage as part of an overall wallet, or a spend percentage as part of an industry wallet or sector wallet.

11. The system of claim 8, wherein the behavioral data comprises location data, and wherein the system further comprises creating the location data via one or more beacons.

12. The system of claim 8, wherein the behavioral data comprises website browsing data.

13. The system of claim 8, wherein the signal provider device constructing the at least one signal further comprises the signal provider device determining prior behavioral data relating to the first set of internally held identifiers during a time period before transmitting the electronic stimulus to the plurality of devices, and wherein the at least one signal relates to a change between the behavioral data and the prior behavioral data.

14. The system of claim 8, wherein the randomly selected control group of devices are associated with a third set of internally held identifiers within the signal provider device.

15. A non-transitory computer-readable medium having instructions stored thereon that, when executed by at least one computing device, cause the at least one computing device to perform operations comprising:

receiving a request from a signal requestor device for behavioral data, wherein the request for the behavioral data comprises a reference point for a behavior;

sending a request to a stimulus transmittal device for a first set of anonymized identifiers associated with a plurality of devices exposed to an electronic stimulus by the stimulus transmittal device during a time period, wherein each of the first set of anonymized identifiers represents an identity of one or more of the plurality of devices, and wherein the first set of anonymized identifiers corresponds to a first set of internally held identifiers within the stimulus transmittal device;

receiving the first set of anonymized identifiers from the stimulus transmittal device;

translating the first set of anonymized identifiers to a second set of anonymized identifiers;

sending the second set of anonymized identifiers and the reference point to a signal provider device, wherein the second set of anonymized identifiers correspond to a second set of internally held identifiers within the signal provider device;

receiving at least one signal relating to the behavioral data from the signal provider device, wherein the at least one signal relating to the behavioral data is constructed from raw data stored on the signal provider device for the second set of internally held identifiers based on the reference point and a comparison of the raw data to aggregated behavioral data for a randomly selected control group of devices exposed to at least one of the electronic stimulus or a different electronic stimulus, wherein the raw data remains localized on the signal provider device, wherein the at least one signal does not include the raw data, and wherein the at least one signal relating to the behavioral data comprises an indication of additional behavioral data of a randomly selected group of the second set of internally held identifiers; and sending the at least one signal relating to the behavioral data to the signal requestor device.

16. The non-transitory computer-readable medium of claim 15, wherein the request from the signal requestor device for the behavioral data comprises an identifier vector, and wherein a modification of the identifier vector based on a rule associated with the server platform device identifies the first set of anonymized identifiers.

17. The non-transitory computer-readable medium of claim 15, wherein the behavioral data comprises at least one of an aggregate spend amount, an average spend amount, a median spend amount, a spend frequency, a spend time, a spend percentage as part of an overall wallet, or a spend percentage as part of an industry wallet or sector wallet.

18. The non-transitory computer-readable medium of claim 15, wherein the behavioral data comprises location data, and wherein the non-transitory computer-readable medium further comprises creating the location data via one or more beacons.

19. The non-transitory computer-readable medium of claim 15, wherein the behavioral data comprises website browsing data.

20. The non-transitory computer-readable medium of claim 15, wherein the signal provider device constructing the at least one signal further comprises the signal provider device determining prior behavioral data relating to the first set of internally held identifiers during a time period before transmitting the electronic stimulus to the plurality of devices, and wherein the at least one signal relates to a change between the behavioral data and the prior behavioral data.

* * * * *